(12) United States Patent
Tanaka et al.

(10) Patent No.: US 7,224,480 B2
(45) Date of Patent: May 29, 2007

(54) IMAGING APPARATUS, SYSTEM HAVING IMAGING APPARATUS AND PRINTING APPARATUS, AND CONTROL METHOD THEREFOR

(75) Inventors: Tatsuya Tanaka, Kanagawa (JP); Satoshi Ogiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 10/281,184

(22) Filed: Oct. 28, 2002

(65) Prior Publication Data

US 2003/0081251 A1 May 1, 2003

(30) Foreign Application Priority Data

Oct. 31, 2001 (JP) .............................. 2001-335456

(51) Int. Cl.
*G06F 15/00* (2006.01)
*G06F 15/16* (2006.01)

(52) U.S. Cl. ..................................... 358/1.15; 709/228

(58) Field of Classification Search ................. 35/1.15, 35/1.16, 401, 500; 399/66, 407, 227; 400/62; 709/228–229

See application file for complete search history.

(56) References Cited

U.S. PATENT DOCUMENTS

| | | | |
|---|---|---|---|
| 5,966,199 A | 10/1999 | Manico et al. | 355/39 |
| 6,104,886 A | 8/2000 | Suzuki et al. | 396/429 |
| 6,184,932 B1 | 2/2001 | Tanaka | 348/347 |
| 6,806,978 B1 | 10/2004 | Tamura et al. | 358/1.15 |
| 2003/0122932 A1* | 7/2003 | Shiohara | 348/207.2 |
| 2005/0190265 A1* | 9/2005 | Small | 348/207.2 |

FOREIGN PATENT DOCUMENTS

| | | |
|---|---|---|
| JP | 10-108005 | 4/1998 |
| JP | 10-171613 | 6/1998 |
| JP | 2000-196937 | 7/2000 |
| JP | 2000-243029 | 9/2000 |
| JP | 2000-354218 | 12/2000 |
| JP | 2001-100868 | 4/2001 |
| JP | 2001-111935 | 4/2001 |
| JP | 2001-136241 | 5/2001 |
| JP | 2001-160939 | 6/2001 |
| JP | 2001-202325 | 7/2001 |
| JP | 2001-292404 | 10/2001 |
| JP | 2001-296980 | 10/2001 |

OTHER PUBLICATIONS

U.S. Appl. No. 10/281,181, filed Oct. 28, 2002.
U.S. Appl. No. 10/281,177, filed Oct. 28, 2002.
Japanese Office Action, dated Jan. 16, 2006, in Japanese Appln. No. 2001-335458.

* cited by examiner

*Primary Examiner*—King Y Poon
*Assistant Examiner*—Saeid Ebrahimi
(74) *Attorney, Agent, or Firm*—Fitzpatrick, Cella, Harper & Scinto

(57) ABSTRACT

An imaging apparatus capable of outputting a sensed image to a printing apparatus issues a print request command containing a parameter for designating a print mode to a PD printer apparatus connected via an interface. The imaging apparatus transmits image data corresponding to the print mode on the basis of a data request from the PD printer apparatus. The imaging apparatus transmits, to the PD printer apparatus, the print request command in which the parameter is changed to invalid data, thereby designating printing of the transmitted image data.

17 Claims, 23 Drawing Sheets

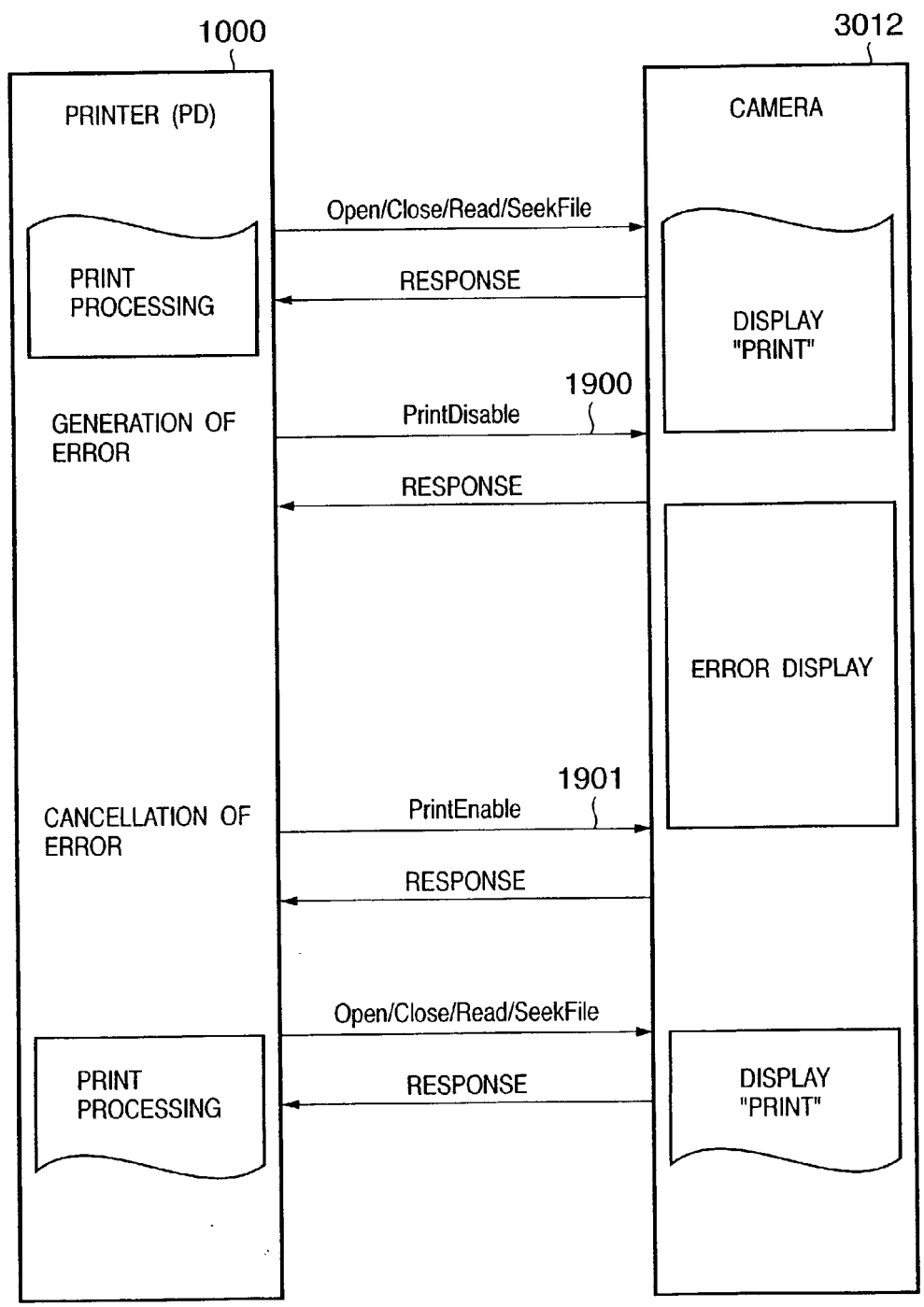

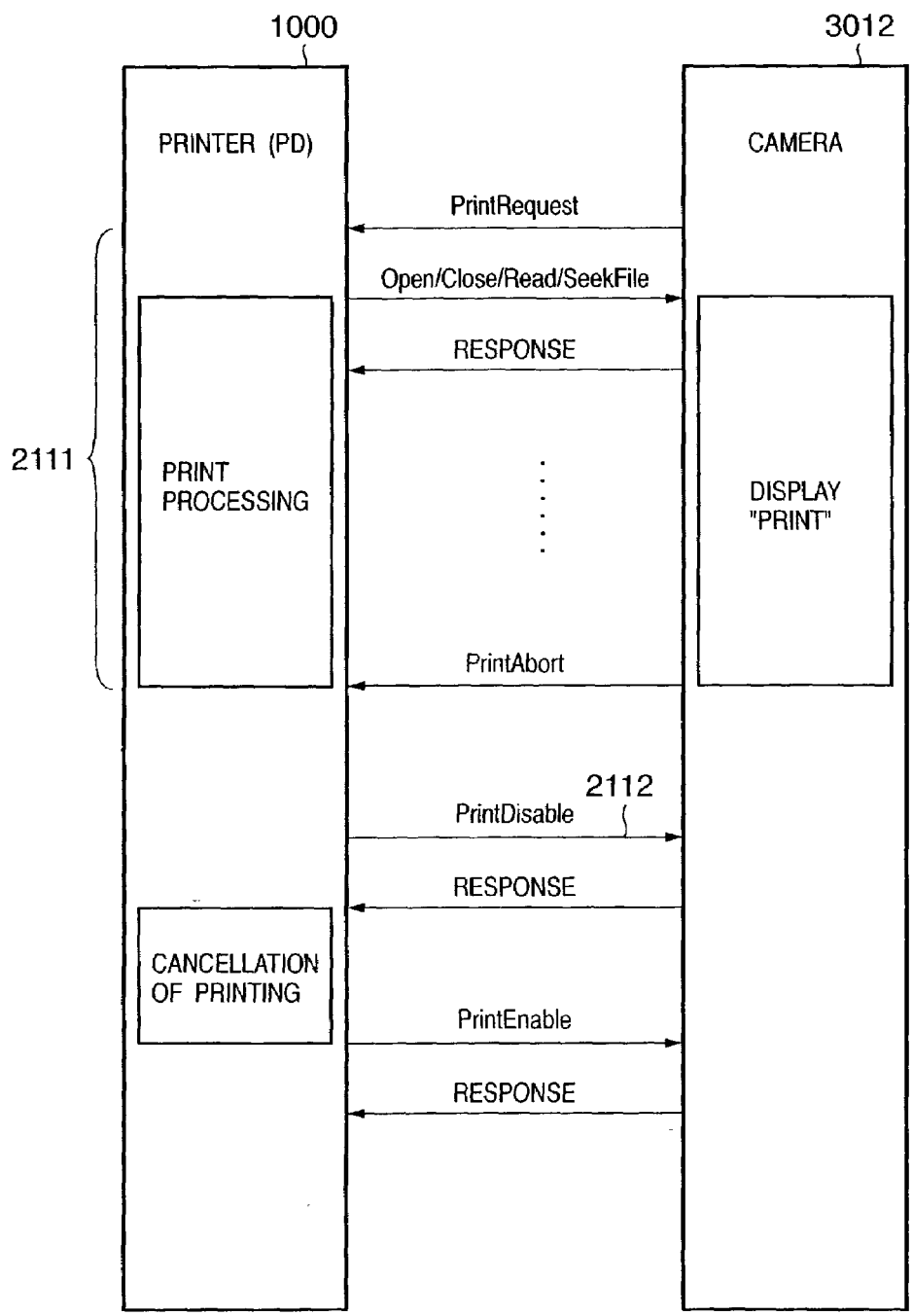

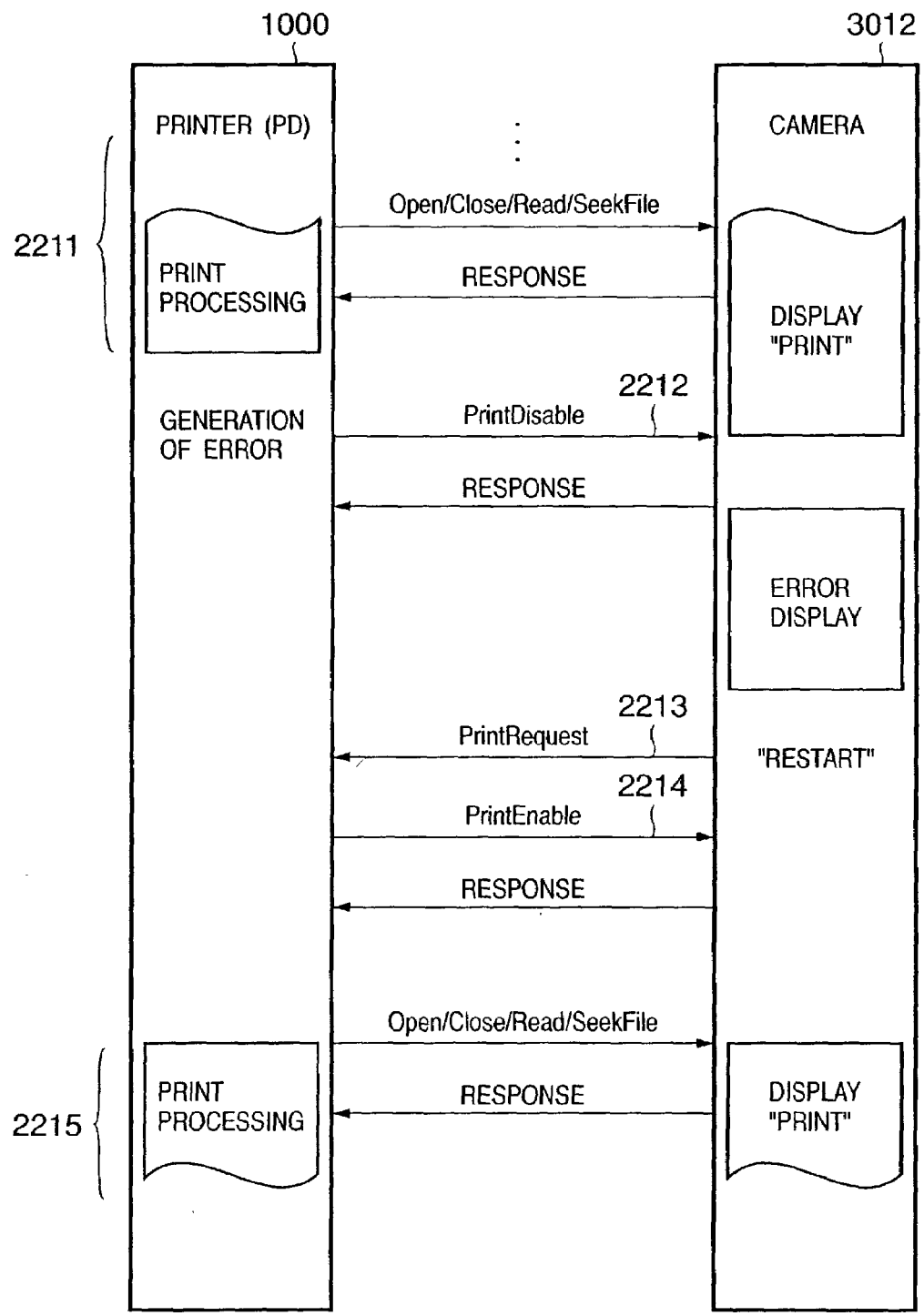

IMAGING APPARATUS, SYSTEM HAVING IMAGING APPARATUS AND PRINTING APPARATUS, AND CONTROL METHOD THEREFOR

FIELD OF THE INVENTION

The present invention relates to an imaging apparatus such as a digital camera, a system having the imaging apparatus and a printing apparatus, and a control method therefor.

BACKGROUND OF THE INVENTION

In recent years, digital cameras (imaging apparatus, imaging device or image sensing apparatuses) capable of photographing an image by a simple operation and converting the image into digital image data have widely been used. To print an image photographed by this camera and use the print as a photograph, the photographed digital image data is temporarily input from the digital camera to a PC (computer), and undergoes image processing by the PC. The processed data is then output from the PC to a color printer, which prints the data.

To the contrary, there have been developed color print systems capable of directly transferring digital image data from a digital camera to a color printer and printing the data without the mediacy of any PC, and so-called photo-direct (PD) printers capable of directly mounting in a color printer a memory card which is mounted in a digital camera and stores a sensed image, and printing the photographed image stored in the memory card.

Especially, in a case where digital image data photographed by a digital camera is directly transmitted to a color printer and printed, there is a case in which a plurality of images are printed in one sheet. In this case, the digital camera sends in series image data with a control code designating "presence/absence of next image" to the color printer. The color printer receives the image data and automatically initiates a printing operation of the received image data when the number of images representing by the received image data reaches a maximum number to be printed on the sheet, and prints the number of images on the sheet.

For, example, in a case where the image data is read from different image files, each of which stores a plurality of items of image data, and printed, when the last image data of an image file is read out and transmitted to the color printer, the control data of the last image data indicates "absence of next image". Therefore, the color printer received the last image data develops the last image data and starts printing of the image data that has bee received before then, because the control data designates "absence of next image". As the result, it is possible that the printed sheet does not include the maximum number of images to be printed on the sheet, e.g., a printing mode for printing 4 images on one sheet is set, but only 1 or 2 images are possible to be printed on the sheet. To prevent from the case, a new control command designating a discharge of printed sheet may be added instead of the control code designating "presence/absence of next image", but adding the new command instead of the control code causes a large amount of change of design.

SUMMARY OF THE INVENTION

The present invention has been made in consideration of the above situation, and has as its object to provide an imaging apparatus which transmits destination of a print mode contained in a print request command in designating printing from the imaging apparatus Lo a printing apparatus, designates the start of print operation by the print request command, and thus expands an existing print request command without newly adding any discharge command, Thereby minimizing the design change and solving the above-described problems, a system having the imaging apparatus and a printing apparatus, and a control method therefor. In addition the apparatus includes means for transmitting to the printing apparatus, the print request command in which a parameter for designating the print mode is changed to invalid data to instruct printing of the image data transmitted by the transmission means.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 21 depicts a signal sequence chart for explaining exchange of signals when an error occurs in the printer apparatus during print processing in the printer apparatus while the PD printer apparatus and digital camera according to the embodiment are connected and perform image printing;

FIG. 22 depicts a signal sequence chart for explaining exchange of signals when the camera issues forced termination of printing during print processing in the printer apparatus while the PD printer apparatus and digital camera according to the embodiment are connected and perform image printing; and FIG. 23 depicts a signal sequence chart for explaining exchange of signals when an error occurs in the printer apparatus during print processing in the printer apparatus and the camera issues forced restart of printing with respect to the error while the PD printer apparatus and digital camera according to the embodiment are connected and perform image printing.

DETAILED DESCRIPTION OF THE PREFERRED EMBODIMENT

A preferred embodiment of the present invention will be described in detail below with reference to the accompanying drawings.

Figure 1:
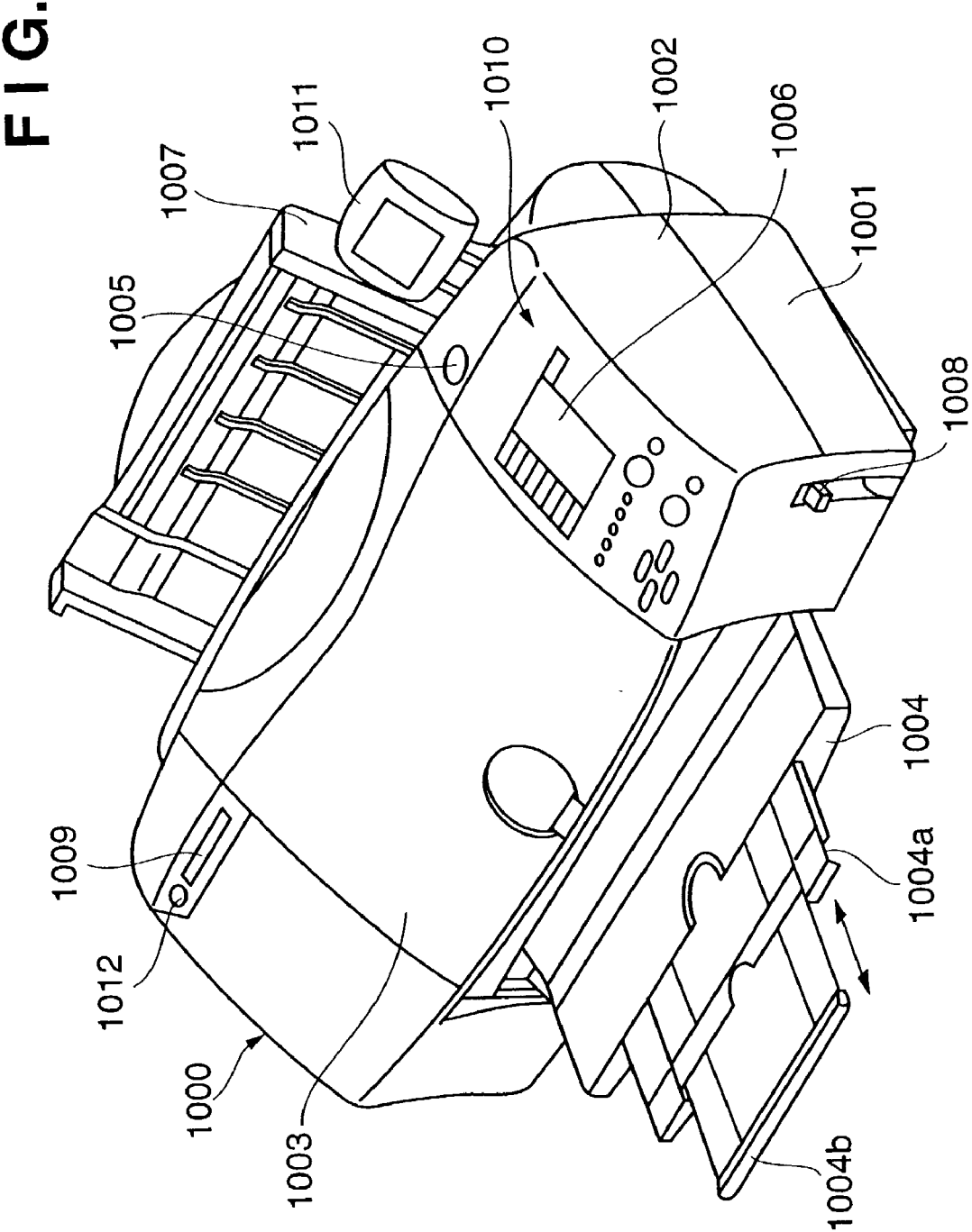
FIG. 1 depicts a schematic perspective view showing a photo-direct printer apparatus according to an embodiment of the present invention.

FIG. 1 is a schematic perspective view showing a photo-direct printer 1000 according to the embodiment of the present invention. The photo-direct printer 1000 has a general PC printer function of receiving data from a host computer (PC) and printing the data, and a function of directly reading and printing image data stored in a storage medium such as a memory card, or receiving image data from a digital camera connected to the printer apparatus and printing the data.

In FIG. 1, the main body which defines the casing of the photo-direct printer 1000 according to this embodiment has casing members: a lower case 1001, upper case 1002, access cover 1003, and discharge tray 1004. The lower case 1001 forms almost the lower half of the printer 1000, whereas the upper case 1002 forms almost the upper half of the main body. A combination of these cases forms a hollow structure with a storage space where each mechanism (to be described later) is accommodated. The upper and front surfaces have openings. The discharge tray 1004 is rotatably held at one end by the lower case 1001, and the opening in the front surface of the lower case 1001 is opened/closed by rotating the discharge tray 1004. To execute print operation, the discharge tray 1004 is rotated toward the front side to open the opening. Print sheets can be discharged from the opening, and the discharged print sheets can be sequentially stacked. The discharge tray 1004 houses two auxiliary trays 1004a and 1004b. These trays are selectively pulled out to enlarge/reduce the paper support area in three stages, as needed.

The access cover 1003 is rotatably held at one end by the upper case 1002 so as to open/close the opening formed in the upper surface. Opening the access cover 1003 enables exchanging a print head cartridge (not shown), ink tank (not shown), or the like accommodated in the main body. Although not shown, a projection formed on the back surface of the access cover 1003 rotates a cover opening/closing lever when the access cover 1003 is opened/closed. The lever rotation position is detected by a microswitch or the like, thereby detecting the open/closed state of the access cover 1003.

A power switch 1005 is provided with the upper surface of the upper case 1002. An operation panel 1010 having a liquid crystal display 1006, various key switches, and the like is arranged on the right side of the upper case 1002. The structure of the operation panel 1010 will be described in detail with reference to FIG. 2. Reference numeral 1007 denotes an automatic feeder which automatically feeds print sheets into the apparatus main body; numeral 1008 denotes a paper interval selection lever for adjusting the interval between the print head and the print sheet; and numeral 1009 denotes a card slot into which an adapter capable of mounting a memory card is inserted. Image data stored in a memory card can be directly received and printed via the adapter. The memory card (PC) includes, e.g., a compact flash memory™, smart media, and memory stick. Reference numeral 1011 denotes a viewer (liquid crystal display) which is detachable from the apparatus main body and is used to display an image of one frame, an index image, and the like when images stored in the PC card are searched for an image to be printed; and numeral 1012 denotes a terminal (input terminal for inputting image data) for connecting a digital camera (to be described later). A USB bus connector 1013 in FIG. 3 for connecting a personal computer (PC) is provided with the back side of the apparatus main body.

Figure 2:
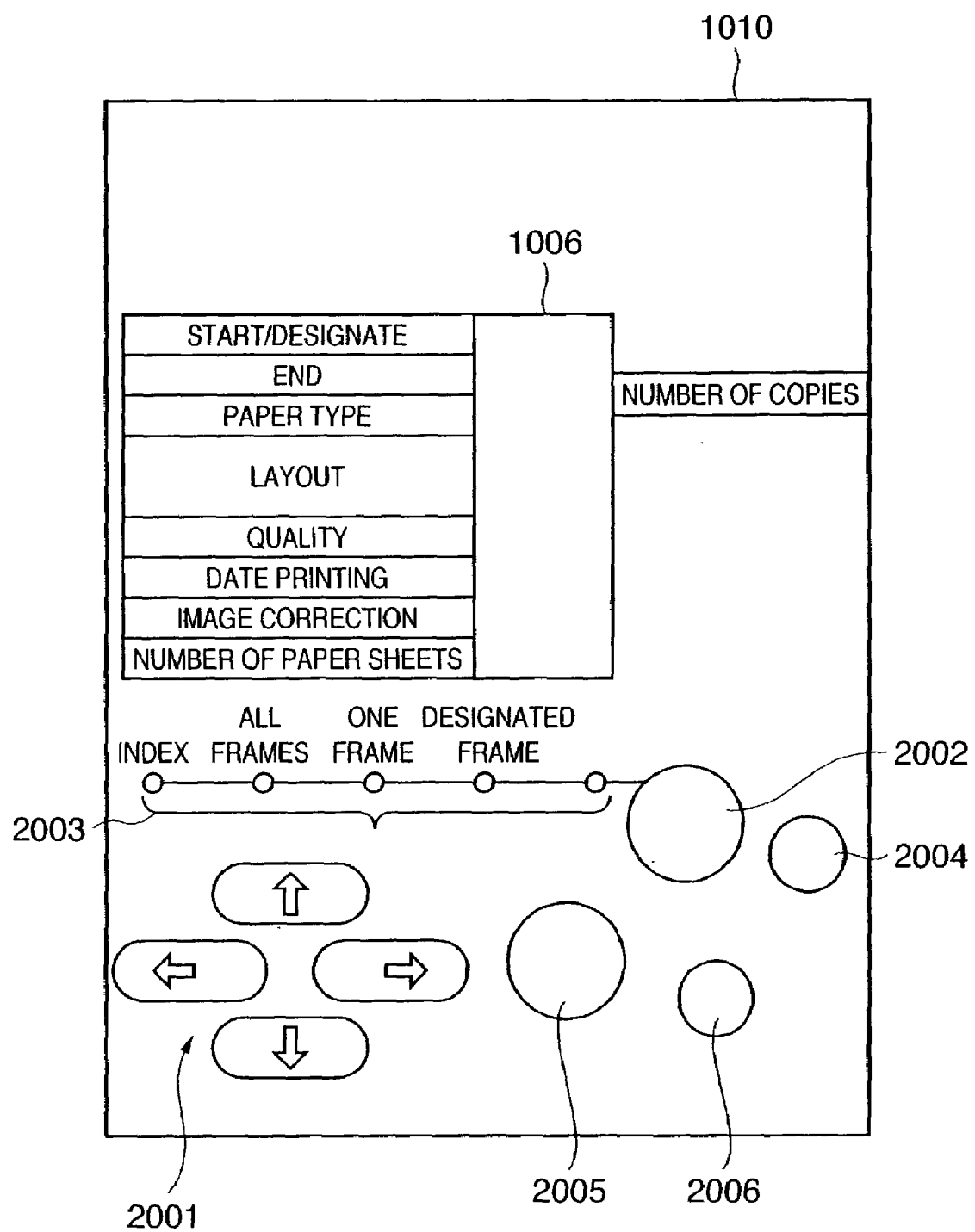
FIG. 2 depicts a schematic view showing the operation panel of the photo-direct printer apparatus according to the embodiment.

FIG. 2 is a schematic view showing the operation panel 1010 according to this embodiment.

In FIG. 2, the liquid crystal display 1006 displays menu items for various settings of data on items printed on the right and left of the display 1006. The displayed items are the first photograph number of a print range, a designated frame number (start/-designate), the last photograph number of the print range (end), the number of prints (number of copies), the type of paper (print sheet) used for printing (paper type), setting of the number of photographs to be printed on one sheet (layout), designation of the print quality (quality), designation whether to print a photographing date (date printing), designation whether to correct and print a photograph (image correction), and display of the number of sheets necessary for printing (number of sheets). These items are selected or designated with cursor keys 2001. Reference numeral 2002 denotes a mode key which allows switching the type of printing (index printing, printing of all frames, printing of one frame, or the like) every time the key is pressed; numeral 2004 denotes a maintenance key for performing printer maintenance such as cleaning of the printer head; numeral 2005 denotes a print start key which is pressed to designate the start of printing or establish maintenance setting; and numeral 2006 denotes a stop key which is pressed to stop printing or designate to stop a maintenance processing.

Figure 3:
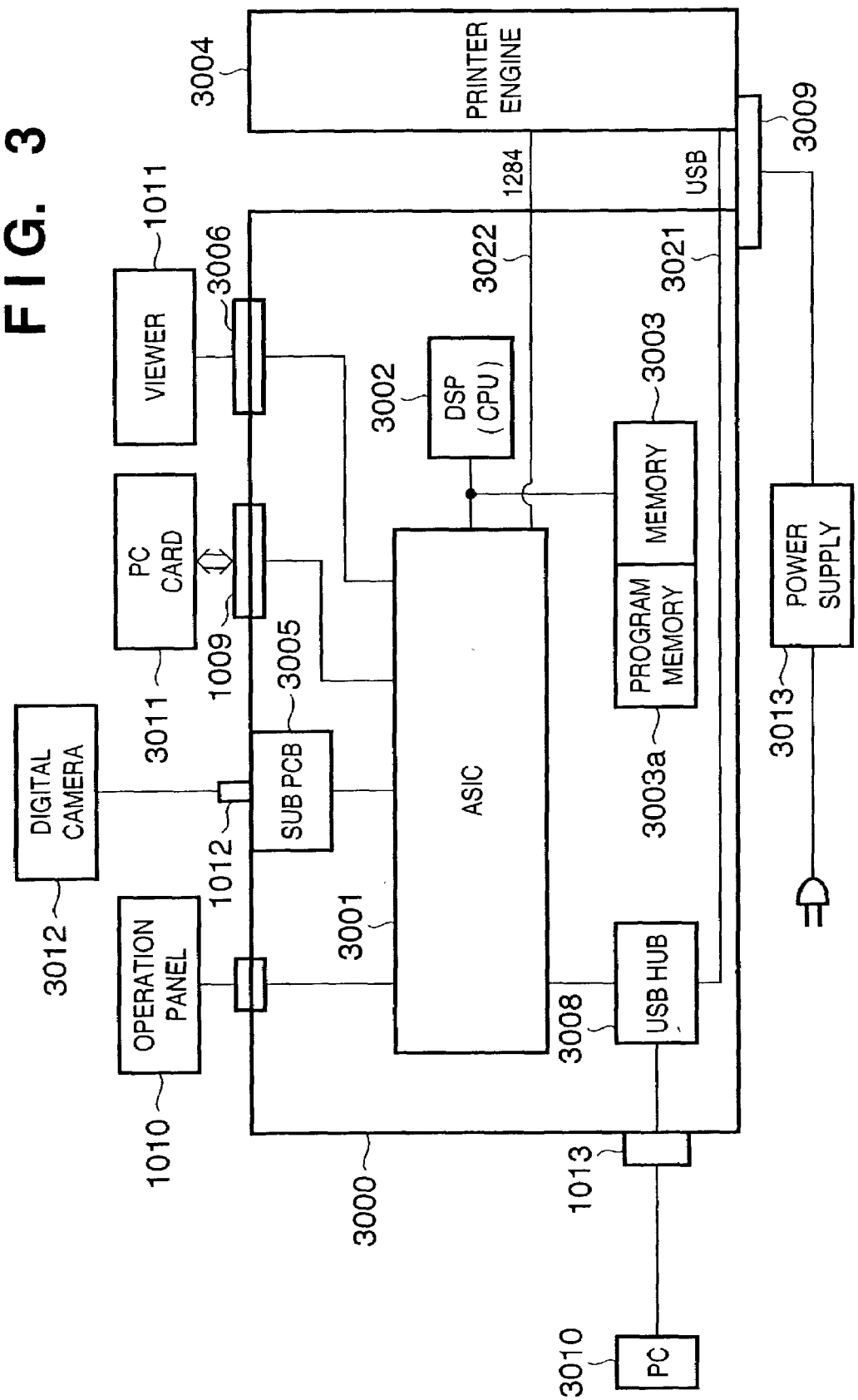
FIG. 3 is a block diagram showing the arrangement of the main part concerning control of the photo-direct printer apparatus according to the embodiment.

The arrangement of the main part concerning control of the photo-direct printer apparatus according to this embodiment will be explained with reference to FIG. 3. In FIG. 3, the same reference numerals as in the foregoing drawings denote the same parts, and a description thereof will be omitted.

In FIG. 3, reference numeral 3000 denotes a controller (control board); numeral 3001 denotes an ASIC (application specific LSI) whose arrangement will be described in detail below with reference to the block diagram of FIG. 4; numeral 3002 denotes a DSP (Digital Signal Processor) which incorporates a CPU and performs various control processes (to be described later), and image processes such as conversion from an RGB signal (RGB signal indicates three primary color signals for display and is called as a luminance signal) to a CMYK signal (CMY signal indicates three primary color signal for printing and a CMYK signal including a black signal is called as a density signal), scaling, gamma conversion, and error diffusion; numeral 3003 denotes a memory having a program memory 3003a which stores the control program of the CPU of the DSP 3002, a RAM area which stores variables and the like in executing a program, and a memory area functioning as a work memory which stores image data and various data; numeral 3004 denotes a printer engine which is an ink-jet print type printer engine for printing a color image by using a plurality of color inks in this embodiment; numeral 3005 denotes a connector serving as a port for connecting a digital camera 3012; numeral 3006 denotes a connector for connecting the viewer 1011; and numeral 3008 denotes a USB bus hub which transmits data from a PC 3010 and outputs the data to the printer engine 3004 via a USB bus 3021 when the printer 1000 performs printing based on image data from the PC 3010. The connected PC 3010 can directly exchange data and signals with the printer engine 3004 and execute printing (functions as a general PC printer). Reference numeral 3009 denotes a power connector which receives from a power supply 3013 a DC voltage converted from a commercial AC voltage. The PC 3010 is a general personal computer. Reference numeral 3011 denotes a memory card (PC card) described above; and numeral 3012 denotes the digital camera.

Signal exchange between the controller 3000 and the printer engine 3004 is performed via the USB bus 3021 or an IEEE 1284 bus 3022.

Figure 4:
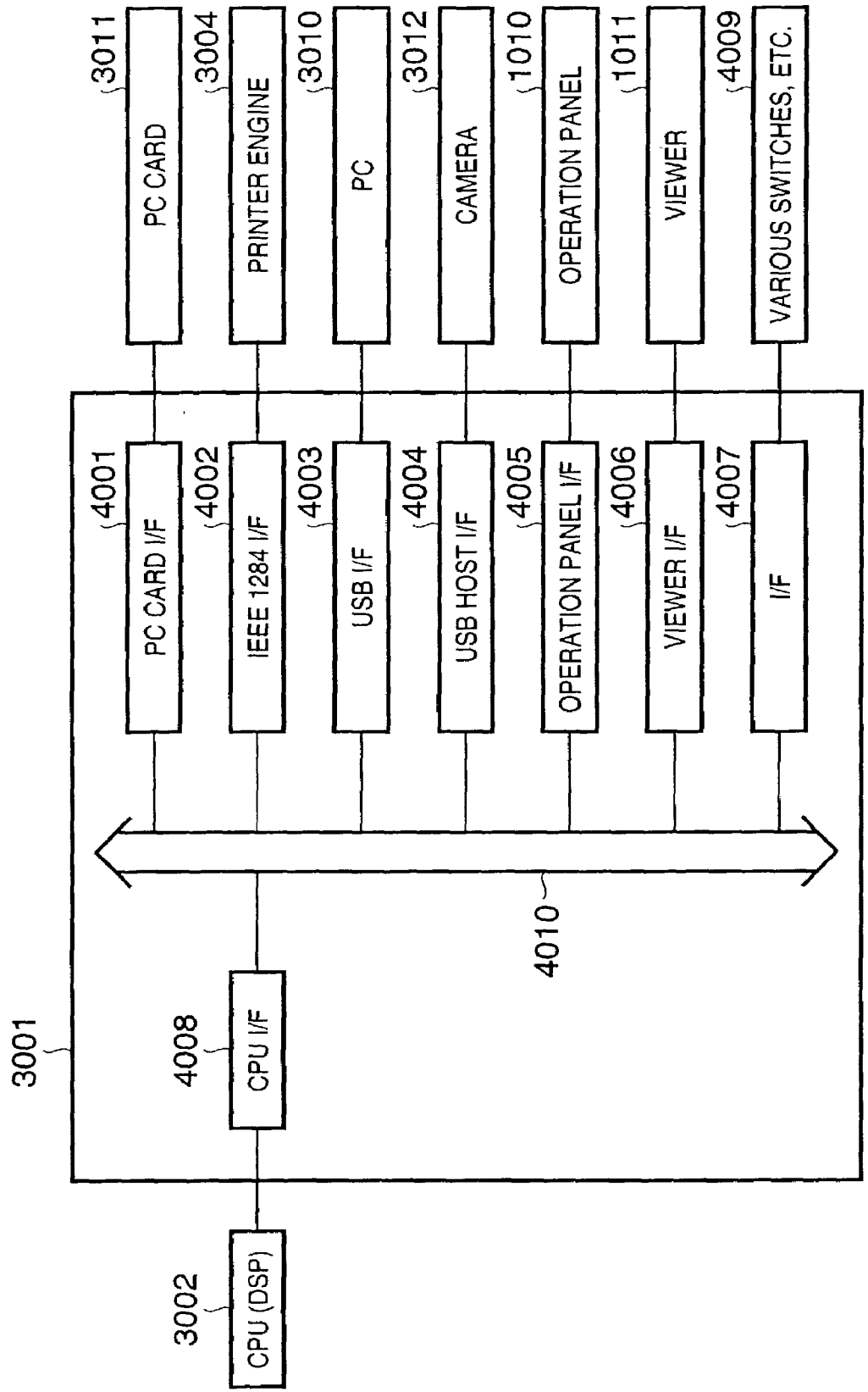
FIG. 4 is a block diagram showing the arrangement of the ASIC of the photo-direct printer apparatus according to the embodiment.

FIG. 4 is a block diagram mainly showing the arrangement of the ASIC 3001. Also in FIG. 4, the same reference numerals as in the foregoing drawings denote the same parts, and a description thereof will be omitted.

Reference numeral 4001 denotes a PC card interface which reads image data stored in the mounted PC card 3011 or writes data in the PC card 3011; and numeral 4002 denotes an IEEE 1284 interface which exchanges data with the printer engine 3004. The IEEE 1284 interface is a bus used to print image data stored in the digital camera 3012 or PC card 3011. Reference numeral 4003 denotes a USB interface which exchanges data with the PC 3010; numeral 4004 denotes a USB host interface which exchanges data with the digital camera 3012; numeral 4005 denotes an operation panel interface which receives various operation signals from the operation panel 1010 or outputs display data to the display 1006; numeral 4006 denotes a viewer interface which controls display of image data on the viewer 1011; numeral 4007 denotes an interface which controls an interface between various switches, an LED 4009, and the like; numeral 4008 denotes a CPU interface which controls data exchange between these interfaces and the DSP 3002; and numeral 4010 denotes an internal bus (ASIC bus) which is connected to these units.

The outline of the operation based on the above arrangement will be described.

<General PC Printer Mode>

The general PC printer mode is a print mode in which an image is printed on the basis of print data from the PC 3010.

In this PC printer mode, when data from the PC 3010 is input via the USB bus connector 1013, the data is directly sent to the printer engine 3004 via the USB bus hub 3008 and USB bus 3021 (FIG. 3). Printing is executed based on the data from the PC 3010.

<Direct Print Mode from PC Card>

When the PC card 3011 is mounted/dismounted in/from the card slot 1009, an interrupt occurs, and the DSP 3002 can detect mounting/dismounting (removal) of the PC card 3011. If the PC card 3011 is mounted, image data which is compressed (e.g., JPEG-compressed) and stored in the PC card 3011 is read out and stored in the memory 3003. The compressed image data is decompressed and stored in the memory 3003 again. If printing of the stored image data is designated on the operation panel 1010, conversion from an RGB signal to a YMCK signal, gamma correction, error diffusion, and the like are executed to convert the data into print data printable by the printer engine 3004. The resultant data is output to the printer engine 3004 via the IEEE 1284 interface 4002 to print the data.

<Direct Print Mode from Camera>

Figure 5:
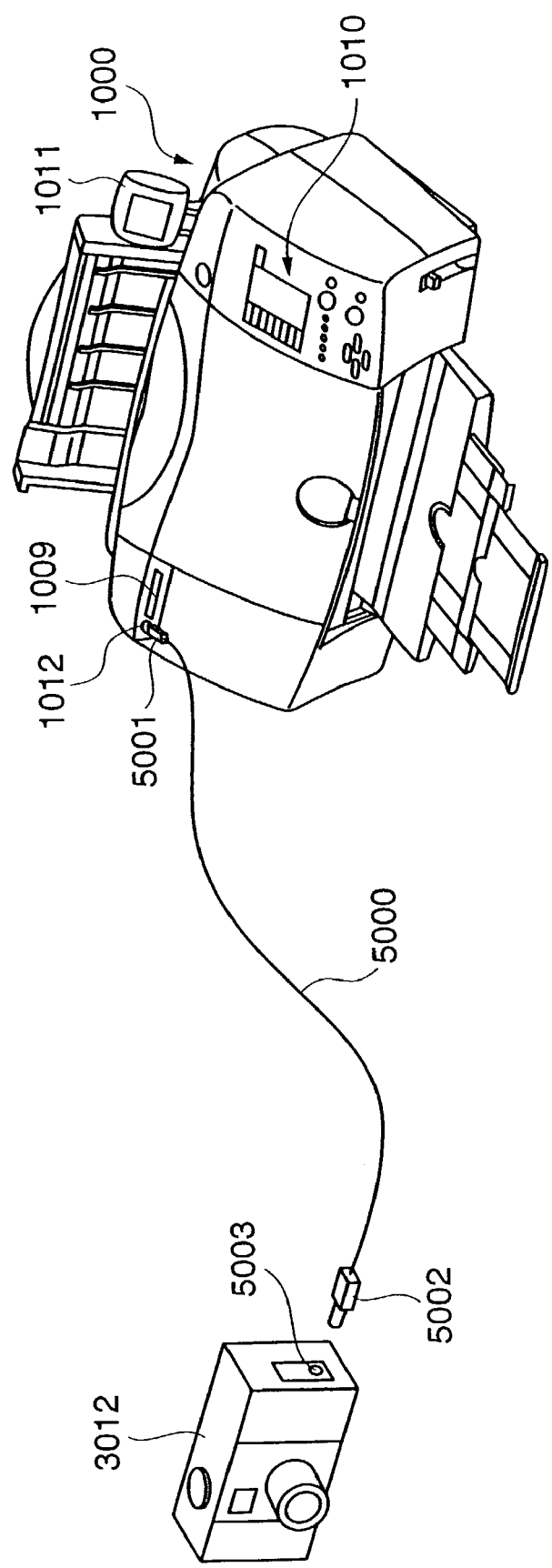
FIG. 5 depicts a view for explaining connection between the photo-direct printer apparatus and a digital camera according to the embodiment.

FIG. 5 is a view for explaining connection between the photo-direct printer 1000 and the digital camera 3012 according to this embodiment.

In FIG. 5, a cable 5000 comprises a connector 5001 connected to the connector 1012 of the printer 1000, and a connector 5002 connected to a connector 5003 of the digital camera 3012. The digital camera 3012 can output via the connector 5003 image data saved in an internal memory. The digital camera 3012 can adopt various arrangements such as one incorporating a memory as a storage means and one having a slot for mounting a detachable memory. By connecting the printer 1000 and digital camera 3012 via the cable 5000 shown in FIG. 5, image data from the digital camera 3012 can be directly printed by the printer 1000.

Figure 6:
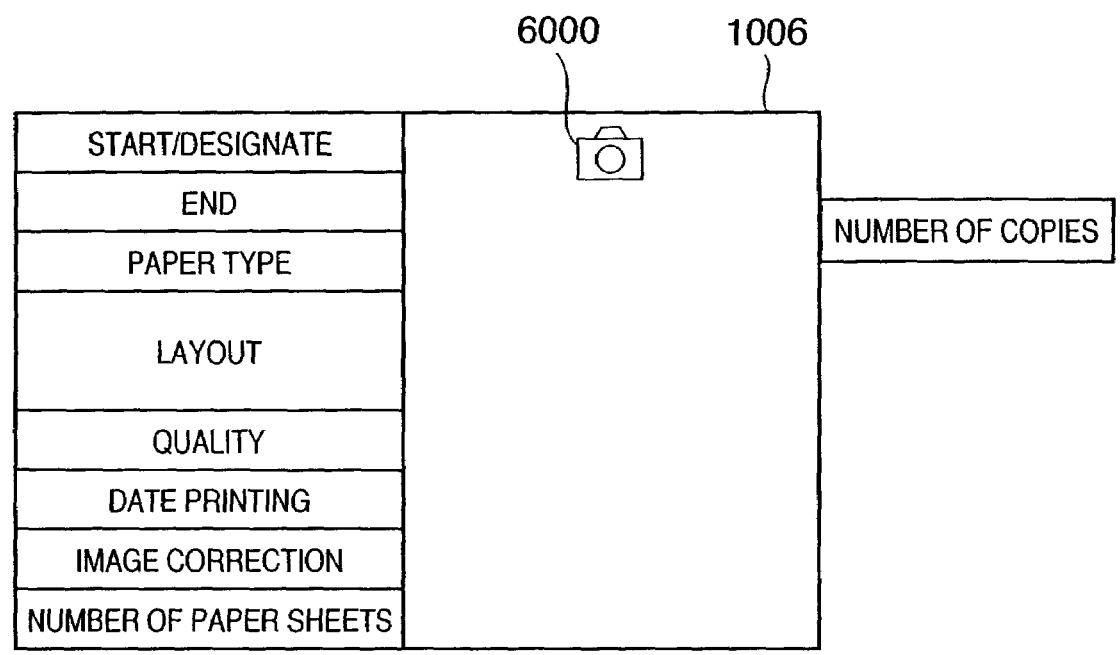
FIG. 6 depicts a view showing a display example on the display of the operation panel when the photo-direct printer apparatus and digital camera according to the embodiment are connected.

FIG. 6 depicts a view showing the display state of the display 1006 of the operation panel 1010 when the digital camera 3012 is connected to the printer 1000. In this case, the display 1006 displays only a camera mark 6000. The display and operation on the operation panel 1010 are invalidated, and image display on the viewer 1011 is also invalidated. As subsequent operation, only key operation on the digital camera 3012 and image display on the display (not shown) of the digital camera 3012 are valid. The user can designate printing by using the digital camera 3012.

An operation when printing is done by connecting the PD printer 1000 and digital camera 3012 according to the embodiment will be explained in detail.

Figure 7:
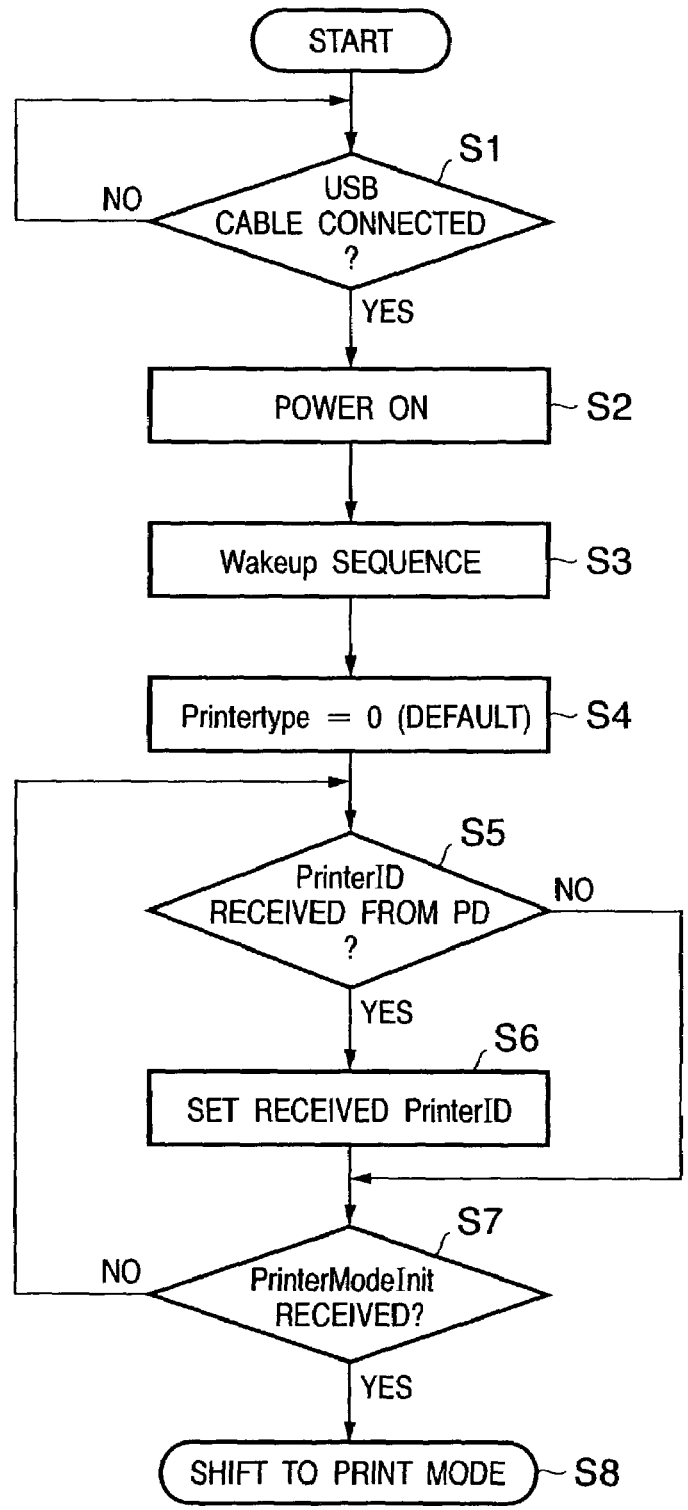
FIG. 7 is a flow chart for explaining an initial state when the PD printer apparatus and digital camera according to the embodiment are connected.
Figure 8:
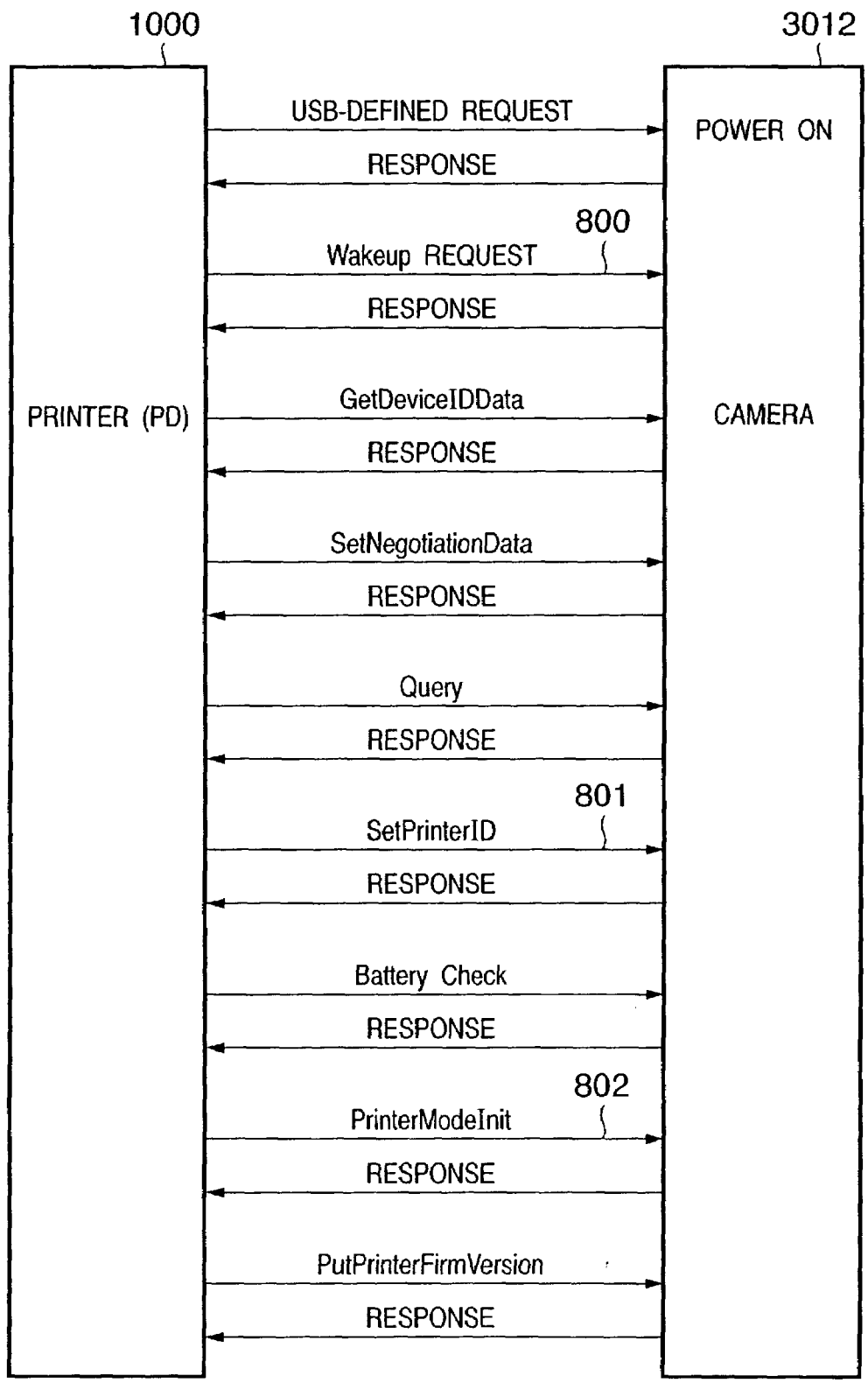
FIG. 8 depicts a signal sequence chart for explaining exchange of signals in initial operation when the PD printer apparatus and digital camera according to the embodiment are connected.

FIG. 7 is a flow chart showing connection processing to the PD printer 1000 in the digital camera 3012 according to the embodiment. FIG. 8 depicts a view for explaining signal protocols between the digital camera 3012 and the PD printer 1000 in connection.

If it is detected in step S1 that the digital camera 3012 has been connected to the PD printer 1000 via the USB bus cable 5000, the flow advances to step S2 to turn on the camera 3012. Whether the USB bus has been connected is detected based on that the voltage level of a given signal on the USB bus reaches a predetermined voltage level. The process then advances to step S3 and a Wake-up sequence is executed in the camera 3012, in response to a Wake-up request 800 (FIG. 8) from the PD printer 1000. As shown by procedures in FIG. 8, when the digital camera 3012 receives commands such as a GetDeviceIDData command, SetNegotiationData, and Query from the PD printer 1000, the camera 3012 acquires information necessary to exchange data and an ID representing the type of the digital camera 3012.

The process advances to step S4 and the type of the connected PD printer 1000 is set to a predetermined type (default value: Printertype=0). The process proceeds to step S5 and it is checked whether a printer ID (PrinterID) from the PD printer 1000 has been received. If the ID of the PD printer 1000 is received by SetPrinterID 801 in FIG. 8, the process proceeds to step S6 and the received PrinterID is stored into a memory (not shown) of the camera 3012. Accordingly, the type of the connected PD printer 1000 is determined. After that, the digital camera 3012 receives a BatteryCheck command from the PD printer 1000, and sends back a response to this command. In step S7, it is checked whether a command (PrinterModeInit) 802 (FIG. 8) representing the end of printer mode setting processing is received from the PD printer 1000. If NO in step S7, the process proceeds to step S5 and the above-described processing is executed; if YES in step S7, the process advances to step S8 and shifts to a print processing mode.

In FIG. 8, if the PD printer 1000 detects connection with the digital camera 3012, the PD printer 1000 transmits to the digital camera 3012 a request defined by the USB bus and various requests according to the embodiment. The camera 3012 sends back a "response" to the requests, thereby executing signal exchange, as shown in FIG. 8.

Figure 9:
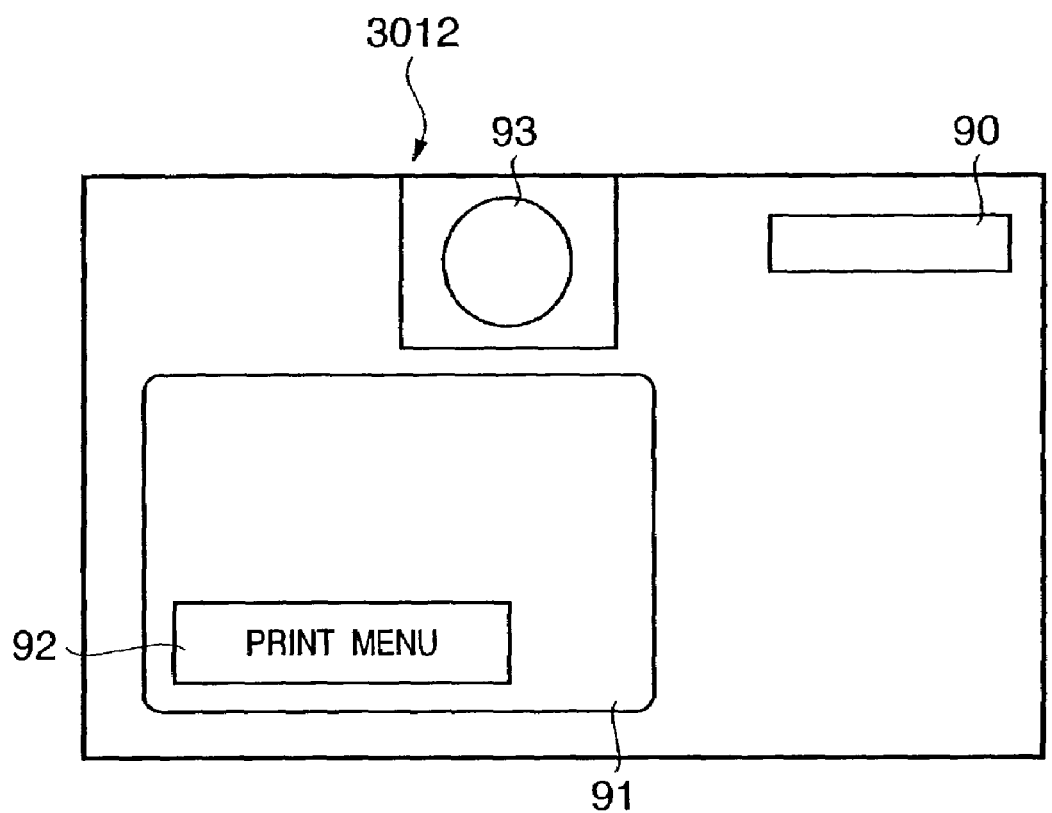
FIG. 9 depicts a schematic view showing the appearance of the operation unit of the digital camera according to the embodiment.

FIG. 9 depicts a view for explaining an operation of the digital camera 3012 when the digital camera 3012 and PD printer 1000 according to the embodiment are connected via the cable 5000.

FIG. 9 shows the back surface of the digital camera 3012. Reference numeral 90 denotes a playback button which designates to play back an image which has been sensed and stored; numeral 91 denotes a liquid crystal display which displays an image, menu, and the like; numeral 92 denotes a print menu; and numeral 93 denotes a viewfinder. Designation of a print image in the digital camera 3012 is basically the same as an operation of creating a DPOF file when developing (printing) of sensed images is ordered for a Photo print shop. More specifically, printing of images can be ordered by pressing the playback button 90 and designating printing of recorded images one by one or whole of recorded images. When the digital camera 3012 is connected to the PD printer 1000, the print menu 92 is displayed on the liquid crystal display 91, and image selection and printing designation are done by using the menu. By selecting the print menu 92, a printing paper size, color/monochrome printing, the type of paper (plain paper, fine paper, or the like) used for printing, unframed/framed printing and the like, can be designated. Also, index printing, date printing, trimming printing, layout printing and the like can be designated.

Figure 10:
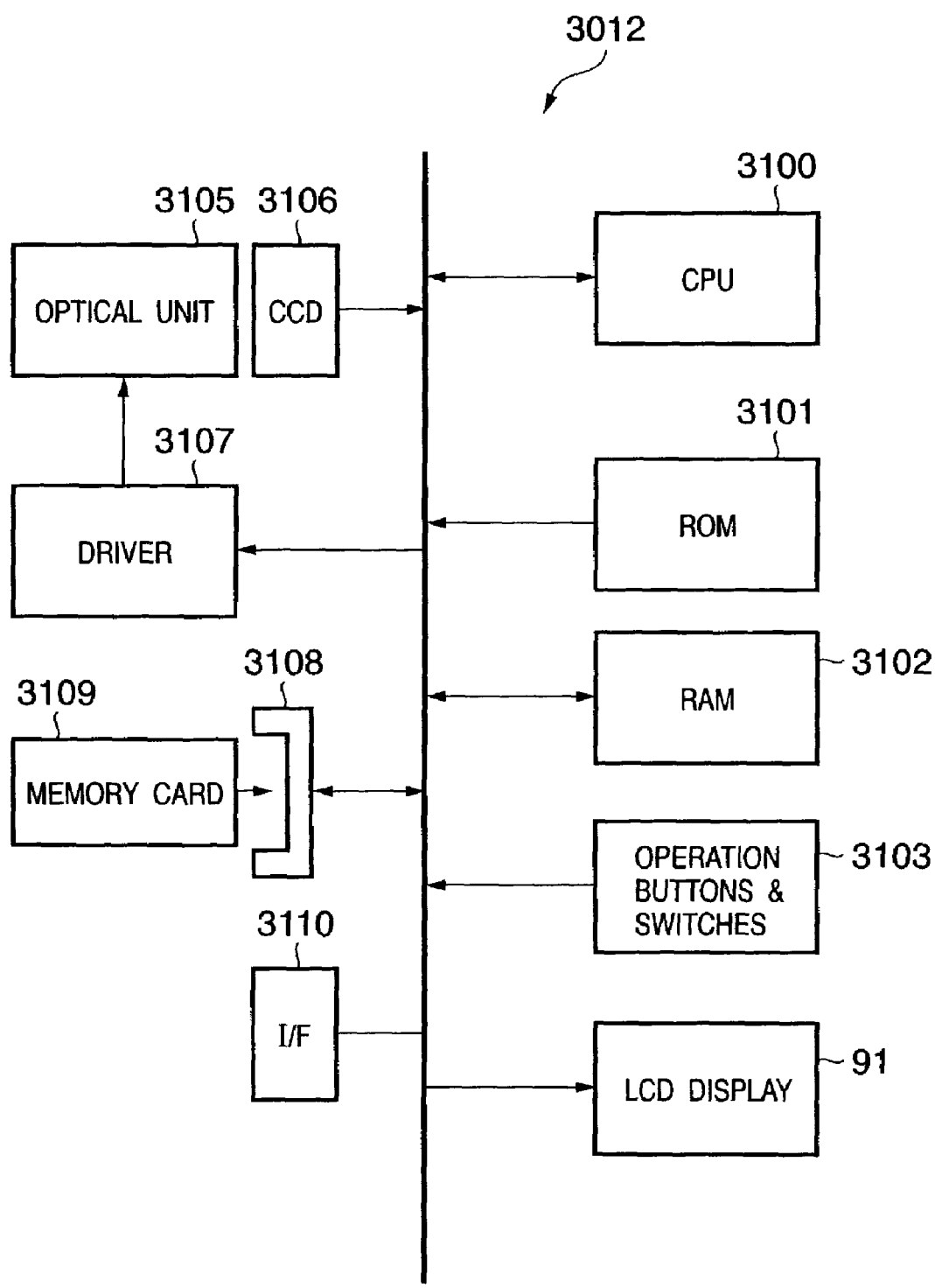
FIG. 10 is a block diagram showing the arrangement of the digital camera according to the embodiment.

FIG. 10 is a block diagram showing a typical arrangement of the DSC 3012 according to the embodiment of the present invention. Some digital cameras connectable to the PD printer 1000 of the embodiment may not have any display 91 to be described later.

In FIG. 10, reference numeral 3100 denotes a CPU which controls the overall DSC; numeral 3101 denotes a ROM which stores a program for describing a processing procedures implemented by the CPU 3100; numeral 3102 denotes a RAM used as the work area of the CPU 3100; and numeral 3103 denotes switches for various operations that include various switches including the above-described switches, cursor keys, and the like. The liquid crystal display 91 is used to confirm a sensed image and display menus for various settings. Reference numeral 3105 denotes an optical unit mainly constituted by a lens and its driving system; numeral 3106 denotes a CCD element; numeral 3107 denotes a driver which drives and controls the optical unit 3105 under the control of the CPU 3100; numeral 3108 denotes a connector for connecting a storage medium 3109 (compact flash® memory card, smart medium, or the like); and 3110, a USB interface (USB slave side) for connecting a PC or the PD printer 1000 of the embodiment.

This embodiment will mainly exemplify printing performed by connecting the PD printer 1000 and DSC 3012 described above. The purpose of this embodiment is to provide a PD printer apparatus capable of connecting a digital camera of each manufacturer and devices (DSPD: Digital Still Photography Devices) such as a cell phone and memory device to an image output apparatus such as the PD printer 1000, and printing an image based on image data acquired from the connected device.

Figure 11:
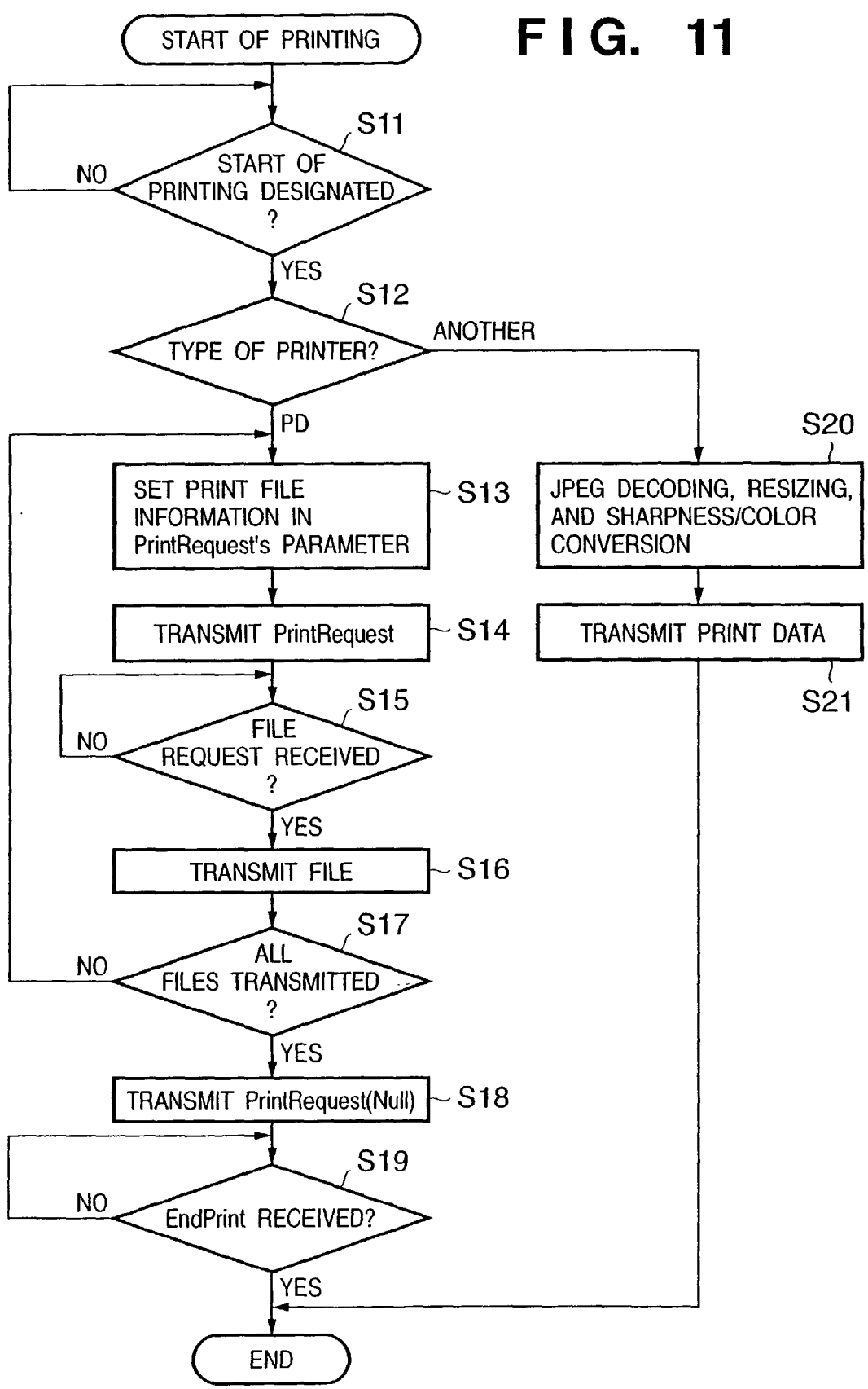
FIG. 11 is a flow chart for explaining an operation when print operation starts in the digital camera while the PD printer apparatus and digital camera according to the embodiment are connected.
Figure 12:
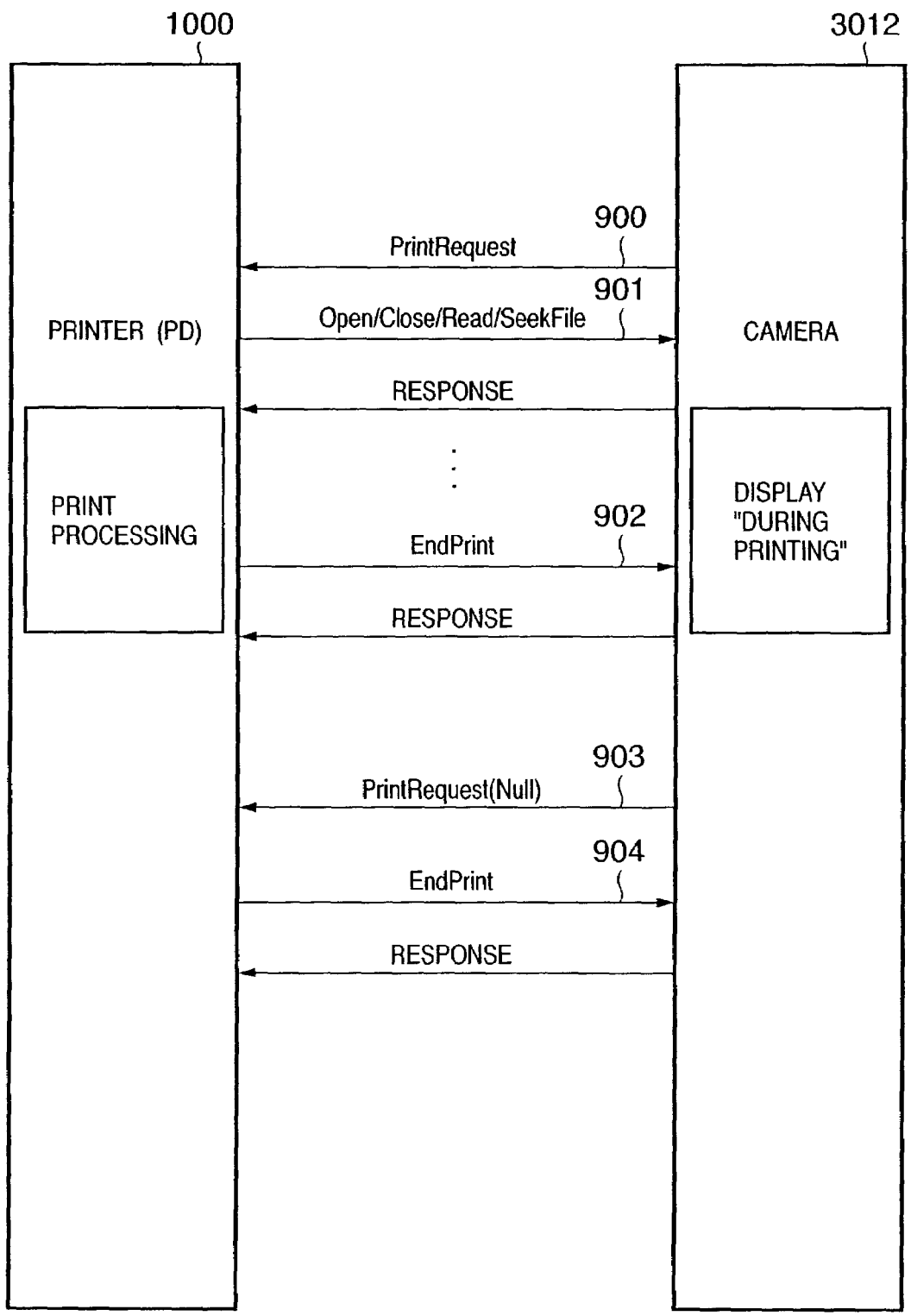
FIG. 12 depicts a signal sequence chart for explaining exchange of signals when the PD printer apparatus and digital camera according to the embodiment are connected and perform normal image printing.

FIG. 11 is a flow chart showing processing in the camera 3012 activated by a designation of the start of printing by the digital camera 3012. A program which executes this processing is stored in the ROM 3101. FIG. 12 depicts a view for explaining protocols when the PD printer 1000 performs a print processing in accordance with a print instruction from the digital camera 3012. While the digital camera 3012 and PD printer 1000 are connected, an operation on the operation panel 1010 of the PD printer 1000 becomes invalid, and an operation with the operation button 3013 of the digital camera 3012 becomes valid. The user operates the button of the camera 3012 to select images to be printed, and designates to print the selected images. Then, a print request is issued from the camera 3012 to the PD printer 1000, thereby the printer 1000 prints the images.

In step S11, it is checked whether a print instruction has been input by manipulating the operation button 3013 of the digital camera 3012. If YES in step S1, the process advances to step S12 and the type of connected printer is determined. This determination is achieved based on a printer ID set in step S6 in the flow chart of FIG. 7. If the type of the printer can not be determined, e.g., unknown printer Id is received, then a predetermined type may be set or a user can set the type. If the PD printer 1000 according to the embodiment has been connected to the camera 3012, the process advances to step S13, information about an image file to be printed is set in a PrintRequest parameter, and the PrintRequest is transmitted to the printer 1000 (900 in FIG. 12). Then a file request command (Open/Close/Read/SeekFile) is received from the PD printer 1000 (901 in FIG. 12) (step S15). In response to this, the image file to be printed is sent to the printer 1000 (step S16). If the image file to be printed is a JPEG file, the JPEG file is transmitted without decoding any JPEG code. This is because the PD printer 1000 according to the embodiment comprises the JPEG decoding function and an image processing function, as described above. The process advances to step S17, and upon reception of EndPrint from the PD printer 1000, it is checked whether all image files have been transmitted. If NO in step S17, the process returns to step S13 and the above-mentioned processing is repeated; if YES, advances to step S18 and a command (PrintRequest (NULL)) in which all PrintRequest parameters are set to "0" (903 in FIG. 12), is transmitted to the PD printer 1000. After then, a sign representing "during printing" of the digital camera 3012 is disappeared, and the print mode is terminated. In step S19, it waits until it receives EndPrint representing the end of print processing from the PD printer 1000 (904 in FIG. 12). After then, the digital camera 3012 terminates the print processing. Because of normal print processing, the PD printer 1000 prints image data transmitted in response to a file request command (Open/Close/Read/SeekFile) every time the PD printer 1000 receives the image data. Even if the PD printer 1000 receives a finally transmitted command (PrintRequest (NULL)) in which all parameters are set to "0", the printer 1000 does not start printing.

If the type of connected printer is determined in step S12 to be one other than the PD printer 1000 according to the embodiment, e.g., to be an apparatus having no JPEG code decoding function, color conversion processing function, or the like, the process proceeds to step S20. The digital camera 3012 decodes a stored JPEG file, changes the image size to a paper size used for printing, and executes sharpness/color conversion and the like. In step S21, the digital camera 3012 has converted the image file into bitmap image data as print image data, and transmits the bitmap image data to the printer apparatus.

In this embodiment, after the process advanced to step S20, the digital camera 3012 has completed decoding, change of the image size, sharpness/color conversion and the like to generate bitmap image data as print data, until the digital camera 3012 detects a timing at which the connected printer apparatus has prepared for predetermined printing and the image data to be printed is transmitted. This shortens the total print processing time. Detection of the timing at which the image data is transmitted is based on reception of an instruction from the connected printer.

In this manner, the digital camera 3012 according to the embodiment checks the type of connected printer when the start of printing is designated. In correspondence with the type of the connected printer, the digital camera 3012 determines whether an image file to be transmitted to the printer is kept JPEG-encoded or a bit-map image data obtained by decoding the JPEG code of the image file. In this way, the digital camera 3012 can transmit the image data (print data) corresponding to the type of the connected printer.

Figure 13:
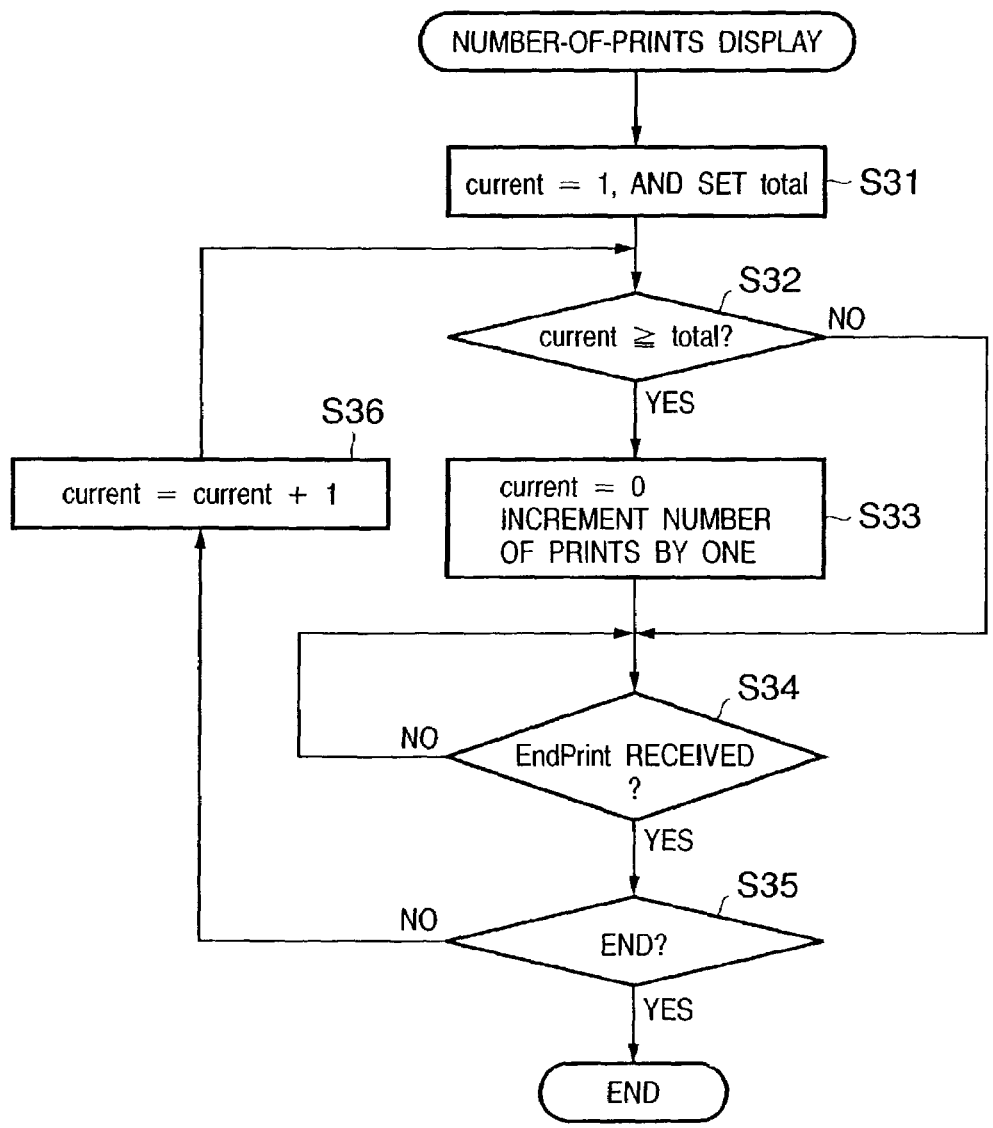
FIG. 13 is a flow chart for explaining coefficient processing of the number of prints in the digital camera according to the embodiment.

FIG. 13 is a flow chart for explaining the count display of the number of prints in the digital camera 3012.

In step S31, both a variable (current) representing a counted number of images and a variable (page) representing a counted number of prints are set to "1", and the maximum number of images to be printed on one sheet is set in a variable (total). These variables are stored in the RAM 3102 of the camera 3012. The process advances to step S32 and it is checked whether the variable (current) value is equal to or larger than the variable (total) value. If YES in step S32, the process proceeds to step S33, the variable (current) is initialized to "0", and the number (page) of prints is incremented by one, and the result is displayed on the liquid crystal display 91 of the digital camera 3012. If NO in step S32, the process proceeds to step S34 and it waits until EndPrint representing the end of printing one image is received from the printer apparatus. Upon reception of EndPrint, the process advances to step S35 and it is checked whether all target image data have been printed. If NO in step S35, the process proceeds to step S36, the variable (current) count value representing a counted number of images is incremented by one, and the process returns to step S32.

If the number of sheets is counted up and displayed every time one image is printed upon printing a plurality of images on one sheet, like index printing or layout printing to be described later, the number of printed images does not coincide with the number of printed sheets. To prevent this, the number (page) of printed sheets is incremented by one when the variable (current) value (number of printed images) reaches the number (total) of images to be printed on one sheet. This makes that the number of printed images and the number of printed sheets become correct.

In this way, the digital camera 3012 as an imaging apparatus issues a print instruction, transfers an image file to be printed to the PD printer 1000 in response to a request from the PD printer 1000, and receives EndPrint from the PD printer 1000 after the completion of the printing. The digital camera 3012 can display the number of printed images on the liquid crystal display 91, on the basis of reception of EndPrint and the number of images to be printed on one sheet.

To print one image on one sheet, the PD printer 1000 sends an image file request corresponding to one image to the digital camera 3012. In response to this request, the digital camera 3012 transmits a corresponding image file to the PD printer 1000. The PD printer 1000 sends EndPrint to the digital camera 3012, after the completion of printing based on the transferred image file. In this case, the number of printed images is counted and displayed every time EndPrint is received. If the total number of images to be printed is obtained in advance by one print instruction, the total number of images and the number of printed images are displayed, providing a high-convenience arrangement for an operator of the digital camera 3012.

In the above example, the number of printed images is displayed. The order of an image being printed can also be displayed by subtracting a value "1" from the number of printed images. Further, the remaining number of images can be displayed by subtracting the number of printed images from the total number of images to be printed.

Print processing in the PD printer 1000 according to the embodiment will be explained.

Figure 14:
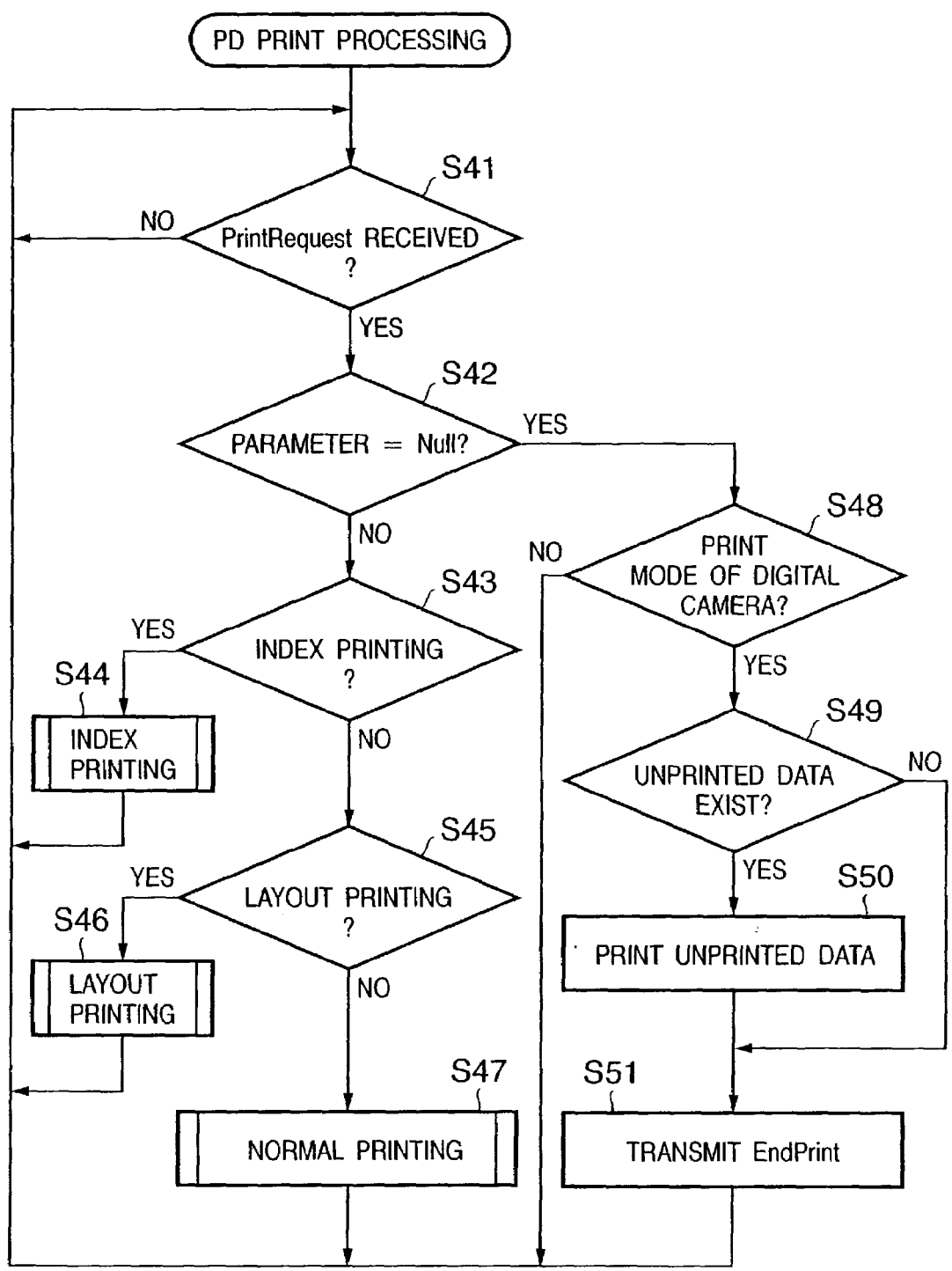
FIG. 14 is a flow chart for explaining print processing operation executed in the printer apparatus while the PD printer apparatus and digital camera according to the embodiment are connected.

FIG. 14 is a flow chart showing normal print processing (not including any index, layout, or date printing) of printing image data from the camera 3012 in the PD printer 1000 according to the embodiment. Exchange of signals between the PD printer 1000 and the digital camera 3012 in this case is the same as that shown in FIG. 12.

In step S41, it waits until PrintRequest (print request) 900 is received from the digital camera 3012. Upon reception of PrintRequest, the process proceeds to step S42 and it is checked whether all the parameters contained in PrintRequest are "0". If NO in step S42, the process advances to step S43 because PrintRequest is a print mode designation command. In step S43, it is checked whether index printing is designated. If YES in step S43, the process advances to step S44 and an index print processing is executed. This processing will be described later with reference to the flow chart of FIG. 17. Parameters set in PrintRequest contain paper type determination codes (including a paper designation code, the presence/absence of the next image, index printing, the presence/absence of trimming, the presence/absence of the date, the presence/absence of unframed printing, and the like), the size of a designated file, and the file name.

Figure 19:
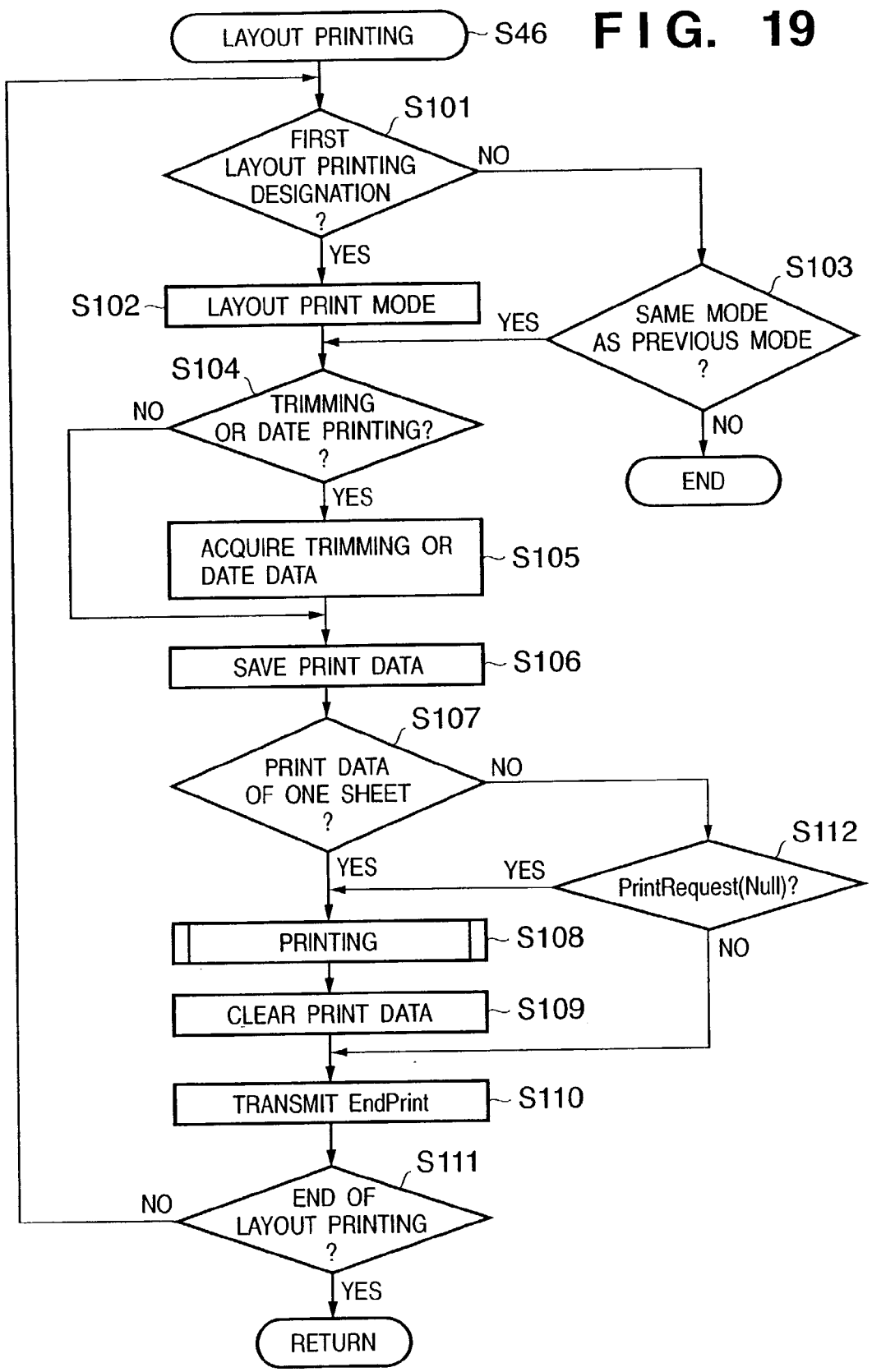
FIG. 19 is a flow chart for explaining layout print operation executed in the printer apparatus while the PD printer apparatus and digital camera according to the embodiment are connected.

If NO in step S43, the process proceeds to step S45 and it is checked whether layout printing is designated. If YES in step S45, the process advances to step S46 and a layout printing to be described later with reference to FIG. 19 is implemented. If neither the index printing nor the layout printing is designated, the process advances to step S47, and a normal print processing of receiving and printing an image file is implemented. The normal print processing will also be described in detail later with reference to the flow chart of FIG. 15.

If all the PrintRequest parameters are "0" (print request) (PrintRequest (NULL)) in step S42, the process advances to step S48 and it is checked whether a print mode for image data from the digital camera 3012 is designated. If YES in step S48, the process advances to step S49 and it is checked whether the print data which has not been printed yet exists. If YES in step S49, the process advances to step S50, the unprinted data is printed. If NO in step S49 or the print processing in step S50 is terminated, the process advances to step S51 and EndPrint representing the end of printing is transmitted to the digital camera 3012. After the processes in steps S44, S46, S47, and S51, the process returns to step S41 again and it waits for the next print request from the digital camera 3012.

[Normal Printing]

Normal print processing in step S47 of FIG. 14 will be explained with reference to the flow chart of FIG. 15 and the sequence chart of FIG. 16.

Figure 15:
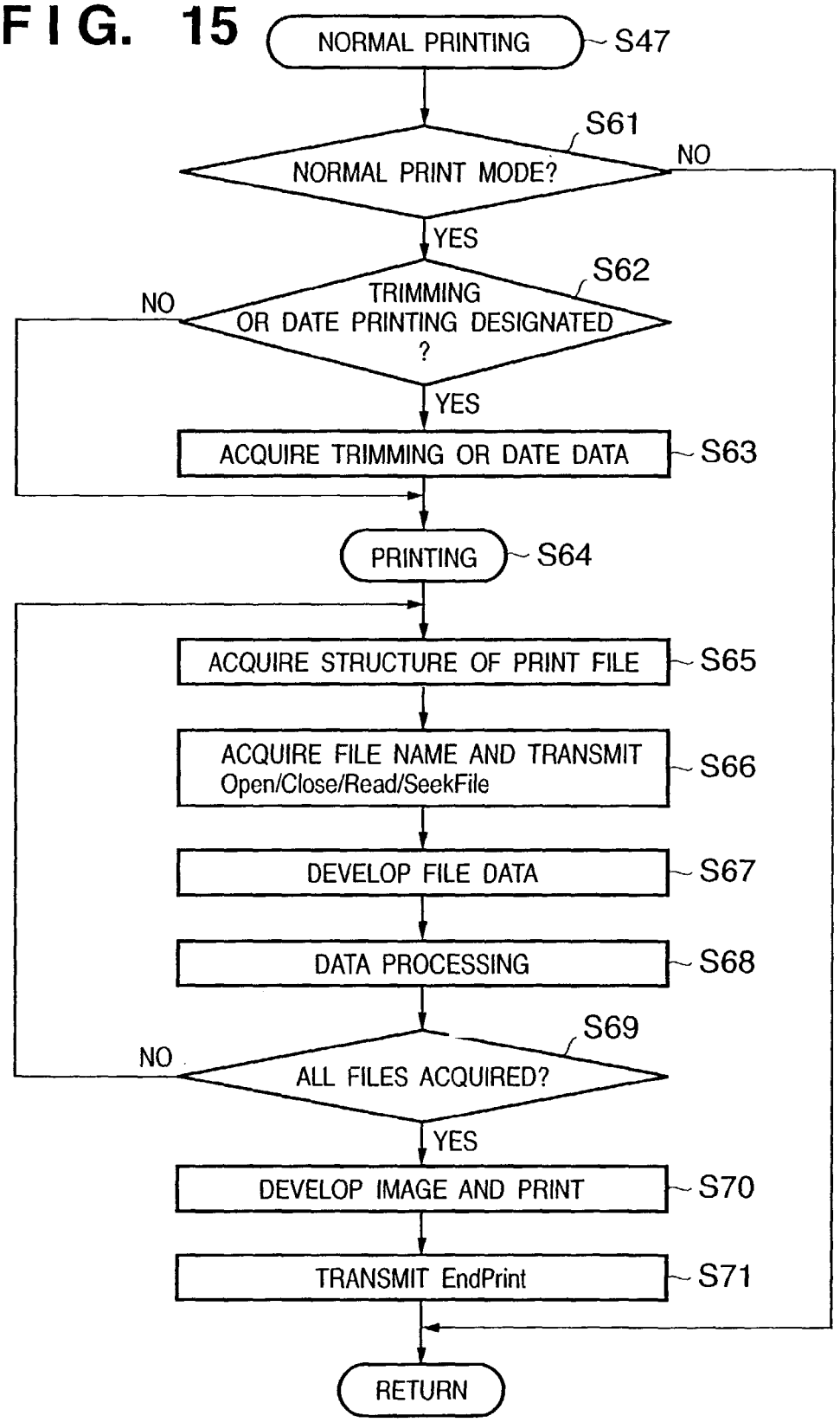
FIG. 15 is a flow chart for explaining normal print operation executed in the printer apparatus while the PD printer apparatus and digital camera according to the embodiment are connected.

In FIG. 15, if the PD printer 1000 receives PrintRequest from the camera 3012 in step S61 (1500 in FIG. 16), it is checked whether a normal print mode other than index printing or layout printing is designated. If NO in step S61, the process ends. If YES in step S61, the process proceeds to step S62 and it is checked whether trimming and/or date printing is designated. If NO in step S62, the process advances to step S64; if YES, the process advances to step S63, GetAdditionalParam (1501) is transmitted to the digital camera 3012, and a trimming position and/or date data is obtained from the camera 3012. In step S64 and subsequent steps, the PD printer 1000 executes print processing.

In step S65, the structure of an image file to be printed is obtained. The process advances to step S66 and the print file name is obtained and an Open/Close/Read/SeekFile command is transmitted to the digital camera 3012 (1502 in FIG. 16). In step S67, the file data from the camera 3012 is acquired, and decoding, change of the size, color conversion and the like are performed. The process advances to step S68, and the developed print data in a layout designated by the camera 3012 is obtained. The process advances to step S69 and it is checked whether all image files to be printed have been acquired. If NO in step S69, the process returns to step S65 and the above-described processing is executed.

If YES in step S69, EndPrint is transmitted to the digital camera 3012 (1503). Thereafter, it is checked whether a print start instruction (PrintRequest (Null)) (1504 in FIG. 16) is received from the digital camera 3012. If PrintRequest has been received, the process advances to step S70, image data is developed into print data, and the print data is supplied to the printer engine 3004, and then print processing is executed. In the print processing, the printer engine 3004 prints an image on a sheet on the basis of the received print data, and discharges the printed sheet. After printing ends, the process proceeds to step S71, EndPrint is transmitted to the camera 3012 (1505 in FIG. 16), and the processing is terminated.

Figure 16:
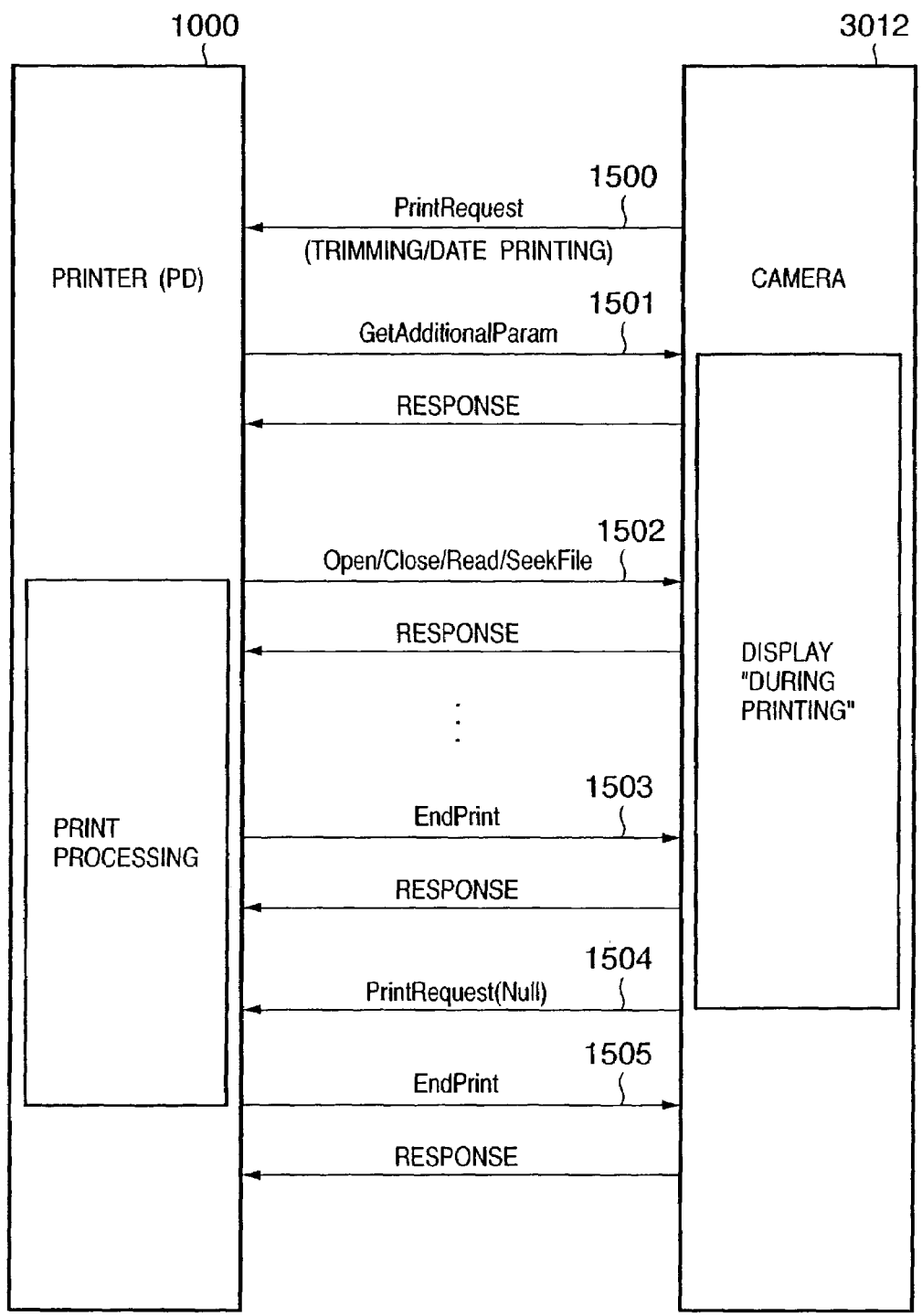
FIG. 16 depicts a signal sequence chart for explaining exchange of signals in trimming and/or date printing when the PD printer apparatus and digital camera according to the embodiment are connected and perform image printing.

FIG. 16 depicts an exchange of data between the PD printer 1000 and the digital camera 3012 when trimming/date printing is performed upon printing an image.

If the first PrintRequest parameter (1500) designates trimming/date printing or the like, the PD printer 1000 transmits GetAdditionalParam (1501) to the digital camera 3012, and requests detailed data. A response to GetAdditionalParam from the digital camera 3012 contains the origin coordinates (x,y) of the trimming range, the trimming range (horizontal width Δx and vertical width Δy), and a character string representing the date. In response to an Open/Close/Read/SeekFile command (1502) from the PD printer 1000, the camera 3012 reads out corresponding image file, and transmits it as a JPEG code to the printer 1000.

[Index Printing]

Figure 17:
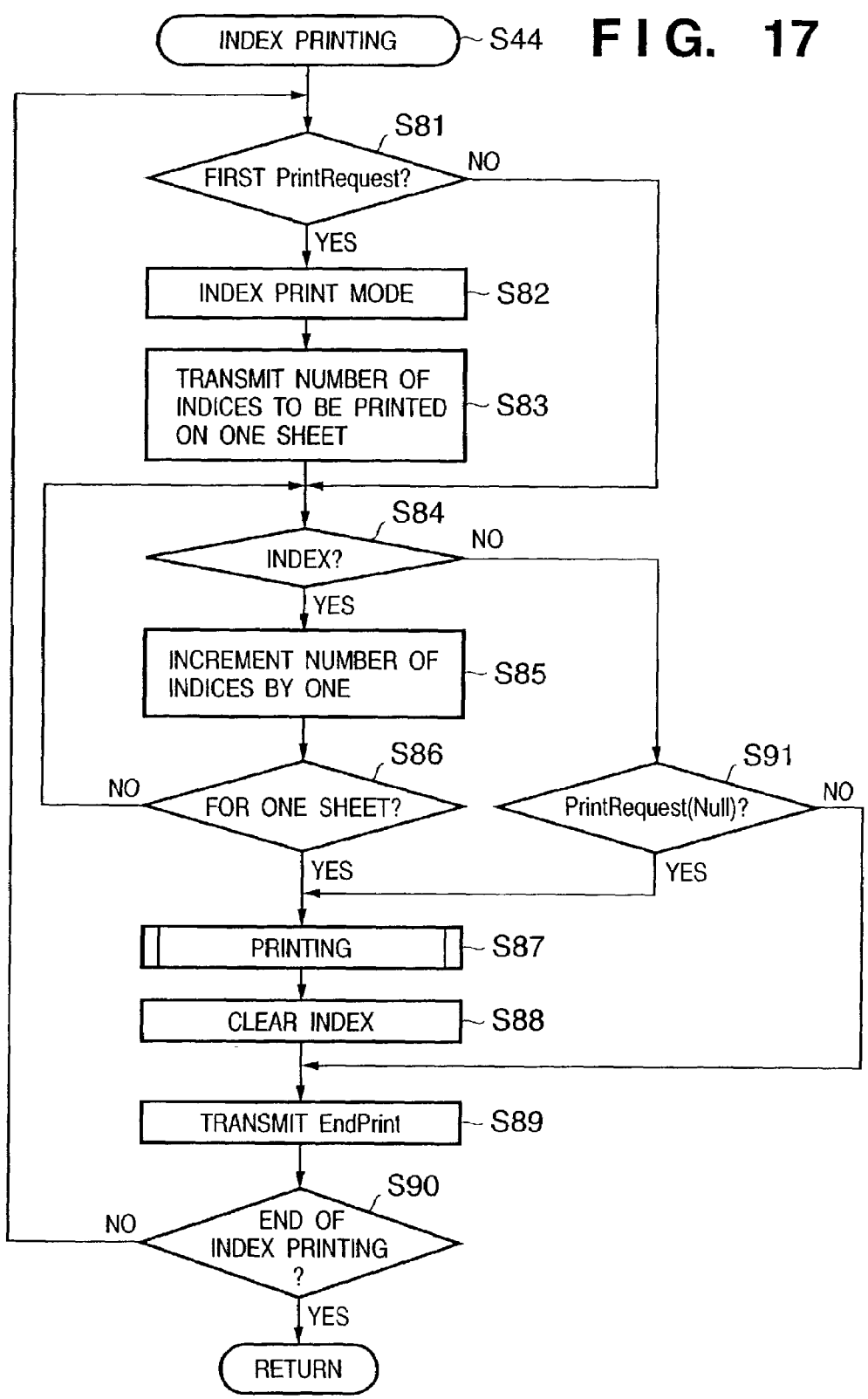
FIG. 17 is a flow chart for explaining index print operation executed in the printer apparatus while the PD printer apparatus and digital camera according to the embodiment are connected.
Figure 18:
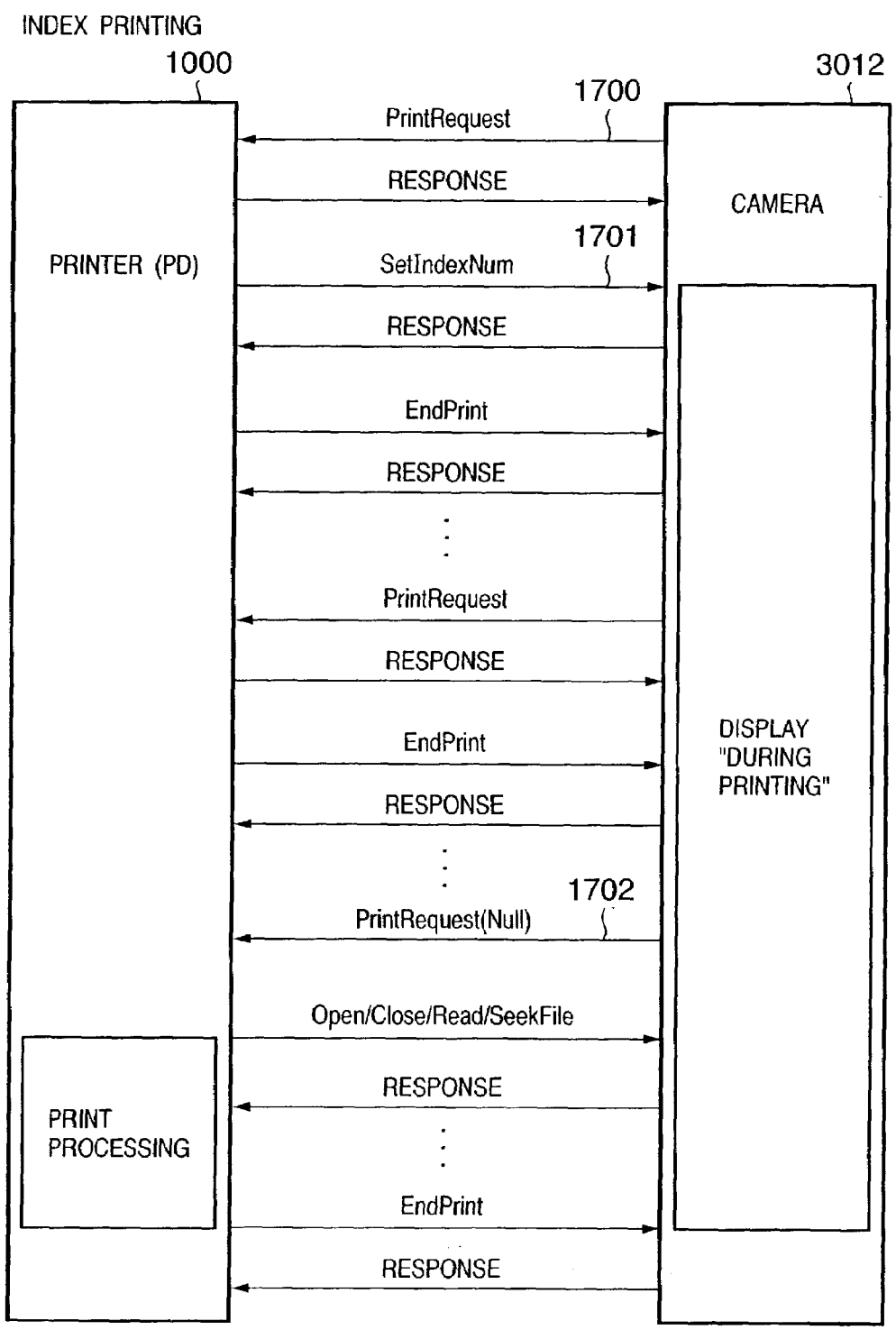
FIG. 18 depicts a signal sequence chart for explaining exchange of signals in index printing when the PD printer apparatus and digital camera according to the embodiment are connected and perform image printing.

FIG. 17 is a flow chart showing index printing in the PD printer 1000 according to the embodiment. Index print processing is to print as a thumbnail image the index of an image stored in the digital camera 3012. In the index printing, a plurality of thumbnail images are arranged and printed in a print medium. FIG. 18 depicts a protocol view for explaining exchange of signals in executing index print processing.

In step S81, the PD printer 1000 receives PrintRequest from the digital camera 3012 (1700 in FIG. 18), and checks whether this PrintRequest is the first PrintRequest designating index printing. If YES in step S81, the process advances to step S82 and an index print mode is set. The process then proceeds to step S83, the number of indices printable on a sheet subjected to printing is obtained, and the number of indices is transmitted to the digital camera 3012. This corresponds to transmission of SetIndexNum in 1701 of FIG. 19. In step S84, it is checked whether index data based on PrintRequest has been received from the digital camera 3012. If YES in step S84, the process proceeds to step S85 and the number of indices is incremented by one: The process advances to step S86 and it is checked whether the number of received indices has reached the number of indices printable on one sheet. If NO in step S86, the process returns to step S84 and the above-described processing is repeated.

If YES in step S86, PrintRequest (NULL) (all parameters are 0) is received from the digital camera 3012 (1702). The process then advances to step S87 and print processing is implemented as in step S64 and subsequent steps in the flow chart of FIG. 15. In this case, Open/Close/Read/SeekFile from the printer 1000 designates the address of a JPEG code where the index data of the image file is stored. The image file is read out from the designated address in the digital camera 3012 and transmitted to the printer 1000. Index printing can, therefore, be easily performed. After printing on one sheet ends, the process advances to step S88 and all printed index data are erased. The process advances to step S89, and EndPrint is transmitted to the digital camera 3012, thereby the printer 1000 notifies the digital camera 3012 of the end of index printing on one sheet. The process advances to step S90 and it is checked whether print processing of all indices has ended. If NO in step S90, the process returns to step S81.

If the PrintRequest parameter does not designate index printing in step S84, the process proceeds to step S91 and it is checked whether the PrintRequest is PrintRequest (NULL) in which all parameters are "0". If YES in step S91, this PrintRequest is a print instruction from the digital camera 3012. The process advances to step S87 and print processing is executed as in step 64 and subsequent steps in the flow chart of FIG. 15. This print instruction designates the restart of index printing when the number of indices has not reached the maximum number of indices printable on one sheet. If NO in step S91, the process advances to step S89 and the printer 1000 responds to the camera 3012 by EndPrint.

[Layout Printing]

FIG. 19 is a flow chart showing a layout print processing in the PD printer 1000 according to the embodiment. The layout print processing is to lay out on one sheet a plurality of images stored in the camera 3012 and print the images.

In step S101, the PD printer 1000 receives PrintRequest designating layout printing from the digital camera 3012, and it is checked whether this PrintRequest is the first PrintRequest. If YES in step S101, the process advances to step S102 and a layout print mode is set. The process advances to step S104 and it is checked whether trimming and/or date printing is designated. If NO in step S104, the process advances to step S106; if YES, the process advances to step S105 and trimming and/or date data is obtained. This is achieved by GetAdditionalParam in 1501 of FIG. 16.

The process then advances to step S106 and image data is saved. The process advances to step S107 and it is checked whether all image data to be printed on one sheet have been saved. If YES in step S107, the process advances to step S108 and print processing is executed as in step S64 and subsequent steps in the flow chart of FIG. 15. After layout printing on one sheet ends, the process proceeds to step S109 and printed image data is cleared. The process advances to step S110, and EndPrint is transmitted to the digital camera 3012, thereby the printer 1000 notifies the camera 3012 of the end of layout printing on one sheet. The process advances to step S111 and it is checked whether layout print processing has ended. If NO in step S111, the process returns to step S101.

If the mode is the same as the first layout print mode in step S103, the process advances to step S104 and the above-described processing is executed. If NO in step S103, the PD printer 1000 ends print processing.

If NO in step S107, the process advances to step S112 and it is checked whether the PrintRequest is PrintRequest (NULL) (print request) in which all parameters are "0". If YES in step S112, this PrintRequest is a print instruction from the camera 3012. The process proceeds to step S108 and the above-described print processing is executed. This print instruction designates the start of printing when the number of laid out images has not reached the maximum number of images to be laid out on one sheet. If NO in step S112, the process proceeds to step S110 and the printer 1000 responds to the digital camera 3012 by EndPrint.

[Printer Error Processing]

Figure 20:
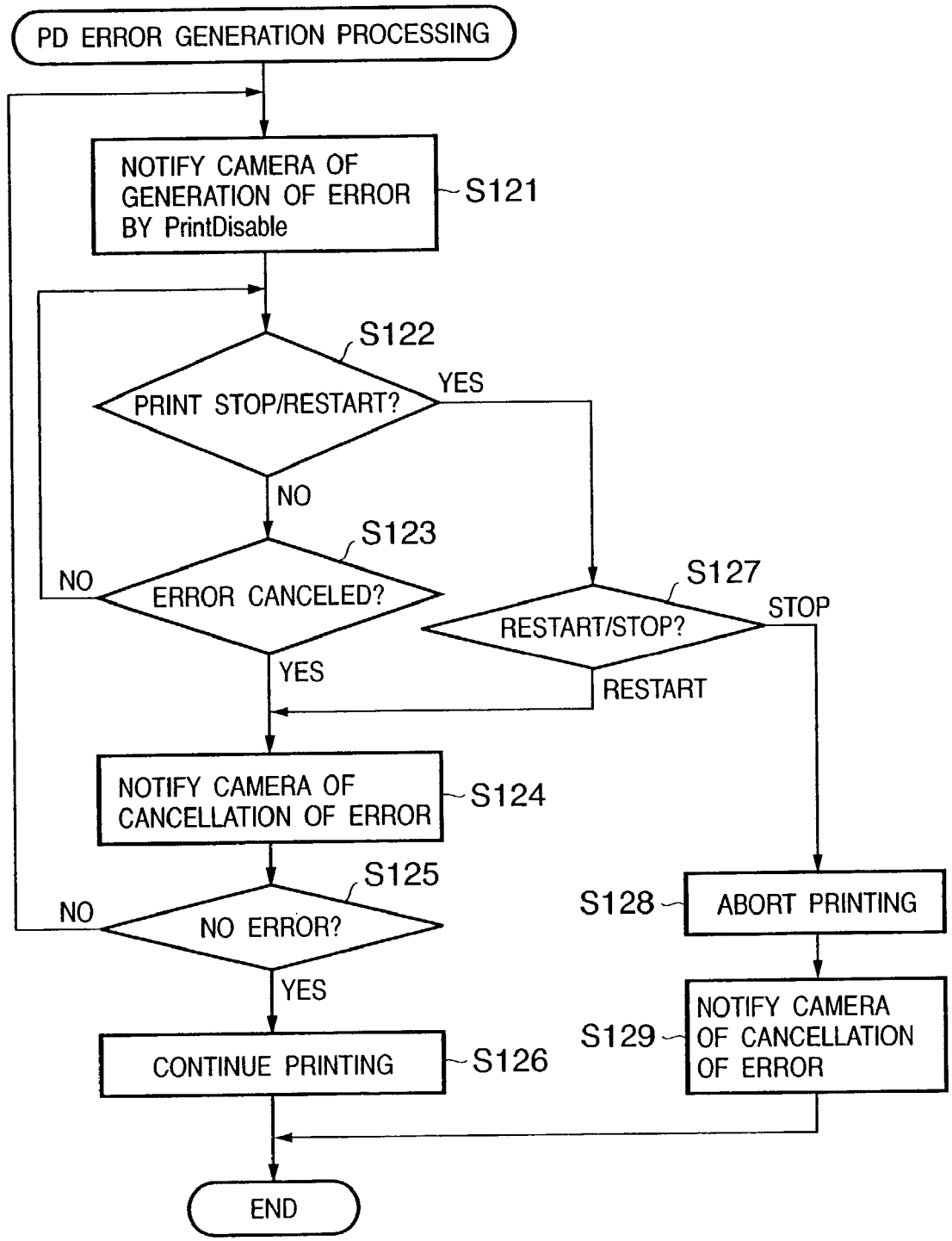
FIG. 20 is a flow chart for explaining an operation when an error occurs in the printer apparatus during print processing in the printer apparatus while the PD printer apparatus and digital camera according to the embodiment are connected.

FIG. 20 is a flow chart showing processing when an error occurs in the PD printer 1000 according to the embodiment. FIG. 21 is a sequence chart for explaining exchange of signals in this case.

In step S121, if any error occurs in the printer 1000, the printer 1000 transmits, to the camera 3012, PrintDisable representing printing cannot be continued (1900 in FIG. 21). This PrintDisable notifies the digital camera 3012 of the type of generated error. The flow advances to step S122 to check whether a print stop/restart instruction has been issued. If NO in step S122, the process advances to step S123 to check whether the error in the printer 1000 has been canceled. If YES in step S123, the process advances to step S124 to notify the camera 3012 of the cancellation of the error (1901 in FIG. 21). Then, the process advances to step S125 to check whether another error has occurred. If YES in step S125, the process returns to step S121; if all errors have been canceled, the process advances to step S126 to continuously execute the current print processing.

If the restart/stop of printing is designated by the camera 3012 in step S122, the process advances to step S127. For a print restart instruction, the process advances to step S124 to notify the digital camera 3012 of the cancellation of the error. If the stop of printing is designated in step S127, the process advances to step S128 to abort print processing and notify the camera 3012 of the cancellation of the error.

FIG. 22 depicts a sequence chart showing processing when the digital camera 3012 issues a forced print termination instruction during print processing in the PD printer 1000 according to the embodiment.

If the forced termination of print processing is designated by a forced termination instruction (PinrtAbort) input from the digital camera 3012 during print processing 2111, the printer 1000 aborts print processing in progress and transmits PrintDisable to the digital camera 3012 (2112). Upon reception of a response to PrintDisable from the digital camera 3012, the printer 1000 completely cancels print operation, and transmits, to the digital camera 3012, PrintEnable representing the possibility of accepting the next print instruction.

FIG. 23 depicts a sequence chart for explaining exchange of signals when print processing aborts due to generation of an error in the PD printer 1000 according to the embodiment and restarts in accordance with an instruction from the digital camera 3012.

If any error occurs in the printer 1000 during print processing 2211, the PD printer 1000 aborts print processing in progress and transmits PrintDisable to the digital camera 3012 (2212). The display on the display 91 of the camera 3012 changes from "during printing" to "error". If the user determines that the error does not inhibit the continuation of printing, he/she designates "restart of printing" using the operation button 3103 of the digital camera 3012. The digital camera 3012 transmits PrintRequest to the printer 1000 (2213). Upon reception of the print request signal, the printer 1000 transmits PrintEnable representing that printing is possible (2214). The PD printer 1000 issues a print file request, and the digital camera 3012 sends back image data in response to the request, thus restarting print processing 2215.

The present invention may be applied to a system constituted by a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions (processes performed on the camera side and various print processes performed on the printer side) of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) running on the computer performs part or all of actual processing on the basis of the instructions of the program codes.

The functions of the above-described embodiment are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

As has been described above, according to the embodiment, a PD printer apparatus can be connected to a digital camera to receive image data from the digital camera and print the image data.

The digital camera according to the embodiment can determine in accordance with the function of the connected printer apparatus whether to output, to the printer apparatus, a JPEG code or decoded data as a data file structure. Data of the determined structure is transmitted to the connected printer apparatus and printed.

The printer apparatus and digital camera according to the embodiment request the start of print operation using a command in which all the parameters of a print request command from the digital camera are set to "0". This can simplify communication procedures between the printer apparatus and the digital camera.

In the number-of-prints count display, the number of printed sheets can be accurately counted and displayed even in a mode in which a plurality of images are printed on one sheet.

The embodiment has exemplified a digital camera as an imaging apparatus, but the present invention is not limited to this. For example, cell phones with an imaging function and a function of saving sensed image data have recently been known. Instead of the digital camera described in the embodiment, such a cell phone can be connected via a connection cable.

As a portable information terminal, PDAs (Personal Digital Assistances) having a liquid crystal monitor capable of displaying an image and a memory capable of saving a sensed image have recently been spread. Such a PDA can be connected via a connection cable to print saved image data, similar to the digital camera in the embodiment.

The PD printer apparatus according to the embodiment can implement the functions of a PC printer, camera printer, and memory printer by one printer apparatus.

Other interfaces, e.g., wireless or using infrared ray such as Bluetooth, IrDA and the like may be provided. In this case, the digital camera determines a type of the printer when a communication between the digital camera and the printer has been established instead of when the camera and the printer are connected.

The present invention is not limited to the above embodiments and various changes and modifications can be made within the spirit and scope of the present invention. Therefore, to apprise the public of the scope of the present invention, the following claims are made.

What is claimed is:

1. A system having an imaging apparatus which outputs a sensed image and a printing apparatus connected to the imaging apparatus via an interface,
   the imaging apparatus comprising:
      issuing means for issuing a print request command containing a parameter for designating a print mode to the printing apparatus connected to the imaging apparatus via the interface;
      transmission means for transmitting image data corresponding to the print mode; and
      means for transmitting, to the printing apparatus, the print request command in which the parameter for designating the print mode is changed to invalid data to instruct printing of the image data transmitted by the transmission means, and
   the printing apparatus comprising:
      data request means for transmitting a data request to the imaging apparatus in accordance with the print request command;
      reception means for receiving the image data transmitted from the imaging apparatus in accordance with the data request from said data request means; and
      print control means for printing the image data in accordance with reception of the image data by said reception means and the print mode, and so controlling the printing apparatus so as to print unprinted image data in response to receiving the print request command in which the parameter is changed to invalid data.

2. The system according to claim 1, wherein the parameter includes information about at least one of a type of print medium used for printing by the printing apparatus, the size of the print medium, index printing, the presence/absence of trimming, and the presence/absence of a date.

3. The system according to claim 1, wherein the invalid data includes NULL data.

4. An imaging apparatus capable of outputting a sensed image to a printing apparatus, comprising:
   issuing means for issuing a print request command containing a parameter for designating a print mode to the printing apparatus connected to the imaging apparatus via an interface;
   transmission means for transmitting image data on the basis of a data request from the printing apparatus; and
   means for transmitting, after the print request command containing a valid parameter for designating the print mode is transmitted to the printing apparatus, the print request command in which the parameter is changed to invalid data, in order to designate the start of printing of unprinted image data that is transmitted by said transmission means, in a case that printing of the image data transmitted by said transmission means is designated.

5. The apparatus according to claim 4, wherein the parameter includes information about at least one of a type of print medium used for printing by the printing apparatus, the size of the print medium, the presence/absence of trimming, and the presence/absence of date.

6. The apparatus according to claim 4, wherein the print request command in which the parameter is changed to invalid data designates the start of printing of unprinted image data transmitted by said transmission means, in a case a plurality of items of image data are arranged in one printing sheet and printed on the one printing sheet and the number of items of image data transmitted by said transmission means does not reach the number of items of image data that are to be printed in one printing sheet.

7. A control method of an imaging apparatus capable of outputting a sensed image to a printing apparatus, the method comprising:
   an issuing step of issuing a print request command containing a parameter for designating a print mode to the printing apparatus connected to the imaging apparatus via an interface;
   a transmission step of transmitting image data on the basis of a data request from the printing apparatus; and
   a step of transmitting, after the print request command containing a valid parameter for designating the print mode is transmitted to the printing apparatus, the print request command in which the parameter is changed to invalid data in order to designate the start of printing of unprinted image data that is transmitted in said transmission step, in a case that printing of the image data transmitted in said transmission step is designated.

8. A computer-readable storage medium which stores a program which executes the control method defined in claim 7.

9. A computer-medium program which is stored on a computer readable storage medium and which executes the control method defined in claim 7.

10. The method according to claim 7, wherein the parameter includes information about at least one of a type of print medium used for printing by the printing apparatus, the size of the print medium, the presence/absence of trimming, and the presence/absence of date.

11. The method according to claim 7, wherein the print request command in which the parameter is changed to invalid data designates the start of printing of unprinted image data transmitted in said transmission step, in a case a plurality of items of image data are arranged in one printing sheet and printed on the one printing sheet and the number of items of image data transmitted in said transmission step does not reach the number of items of image data that are to be printed in one printing sheet.

12. A printing apparatus connected via an interface to an imaging apparatus for outputting a sensed image, comprising:
   data request means for transmitting a data request to the imaging apparatus in accordance with a print request command;
   reception means for receiving image data transmitted from the imaging apparatus in accordance with the data request from said data request means; and
   print control means for printing image data received by said reception means, in a case that the number of items of image data received by said reception means has reached a defined number of image data corresponding to the print mode that is designated by a valid parameter of the print request command, and controlling said printing apparatus so as to print unprinted image data received by said reception means, in response to the print request command in which the parameter is changed to invalid data.

13. The apparatus according to claim 12, wherein in a case that a valid parameter of the print request command designates a print mode in which a plurality of items of image data are arranged in one printing sheet and printed on the one printing sheet, said print control means prints unprinted image data received by said reception means in response to the print request command in which the parameter is changed to invalid data, even if the number of items of image data received by said reception means does not reach the number of items of image data that are to be printed in one printing sheet.

14. A control method of a printing apparatus connected via an interface to an imaging apparatus for outputting a sensed image, the method comprising:
   a data request step of transmitting a data request to the imaging apparatus in accordance with a print request command;
   a reception step of receiving image data transmitted from the imaging apparatus in accordance with the data request from said data request means; and
   a print control step of printing image data received in said reception step, in a case that the number of items of image data received in said reception step has reached a defined number of image data corresponding to the print mode that is designated by a valid parameter of the print request command, and controlling the printing apparatus so as to print unprinted image data received in said reception step, in response to the print request command in which a parameter is changed to invalid data.

15. The method according to claim 14, wherein in a case that a valid parameter of the print request command designates a print mode in which a plurality of items of image data are arranged in one printing sheet and printed on the one printing sheet, in said print control step, unprinted image data received by said reception means is printed in response to the print request command in which the parameter is changed to invalid data, even if the number of items of image data received in said reception step does not reach the number of items of image data that are to be printed in one printing sheet.

16. A computer-readable storage medium which stores a program which executes the control method defined in claim 14.

17. A computer readable program which is stored on a computer readable storage medium and which executes the control method defined in claim 14.

* * * * *

UNITED STATES PATENT AND TRADEMARK OFFICE
CERTIFICATE OF CORRECTION

PATENT NO. : 7,224,480 B2 Page 1 of 1
APPLICATION NO. : 10/281184
DATED : May 29, 2007
INVENTOR(S) : Tanaka et al.

It is certified that error appears in the above-identified patent and that said Letters Patent is hereby corrected as shown below:

COLUMN 1:
Line 55, "bee" should read --been--.
Line 62, "from the case," should read --this--.

COLUMN 2:
Line 11, "Thereby" should read --thereby--.

COLUMN 5:
Line 32, "as" should be deleted.
Line 35, "as" should be deleted.

COLUMN 8:
Line 18, "a" (second occurrence) should be deleted.

COLUMN 9:
Line 16, "YES," should read --YES, the process--.

COLUMN 10:
Line 27, "that" should read --it so that--.

COLUMN 14:
Line 33, "(PinrtAbort)" should read --(PrintAbort)--.

Signed and Sealed this

Seventeenth Day of March, 2009

JOHN DOLL
*Acting Director of the United States Patent and Trademark Office*